(12) United States Patent
Ito

(10) Patent No.: US 9,330,613 B2
(45) Date of Patent: May 3, 2016

(54) IMAGE DISPLAY METHOD AND LIQUID CRYSTAL DISPLAY DEVICE EMPLOYING SAME

(75) Inventor: Hiroshi Ito, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 397 days.

(21) Appl. No.: 13/885,109

(22) PCT Filed: Jun. 13, 2011

(86) PCT No.: PCT/JP2011/063469
§ 371 (c)(1),
(2), (4) Date: May 13, 2013

(87) PCT Pub. No.: WO2012/066815
PCT Pub. Date: May 24, 2012

(65) Prior Publication Data
US 2013/0229446 A1      Sep. 5, 2013

(30) Foreign Application Priority Data

Nov. 15, 2010   (JP) .................................. 2010-254974

(51) Int. Cl.
*G09G 5/10*          (2006.01)
*G09G 3/36*          (2006.01)
(Continued)

(52) U.S. Cl.
CPC .............. *G09G 3/3607* (2013.01); *G09G 3/003* (2013.01); *G09G 3/3648* (2013.01);
(Continued)

(58) Field of Classification Search
CPC ... G09G 3/003; G09G 3/3607; G09G 3/3614; G09G 3/3648; G09G 2310/061; G09G 2310/0224; G09G 2300/0823; H04N 13/0438; H04N 13/0486; H04N 13/0033

USPC .................................................... 345/96, 209
See application file for complete search history.

(56) References Cited

U.S. PATENT DOCUMENTS 8,537,176 B2 *   9/2013   Ko et al. ....................... 345/596
2006/0017746 A1   1/2006   Withbruch et al.
(Continued)

FOREIGN PATENT DOCUMENTS

JP      2000-050312 A      2/2000
JP      2004-336226 A      11/2004
(Continued)

OTHER PUBLICATIONS

International Search Report dated Jul. 5, 2011, as issued in corresponding International Patent Application No. PCT/JP2011/063469, filed Jun. 13, 2011 (with English translation—4 pages).
(Continued)

*Primary Examiner* — Michael Pervan
*Assistant Examiner* — Andrew Lee
(74) *Attorney, Agent, or Firm* — Maier & Maier, PLLC

(57) ABSTRACT

Uniformize afterimages caused by black insertion to each image when two types of images are alternately displayed. There are provided a left and right image alternate output unit, a mask pattern storage unit, a mask pattern selection counter, and a mask synthesizing unit. The left and right image alternate output unit alternately outputs two types of video frames. The mask pattern storage unit stores m mask patterns, wherein basic regions are defined in a pixel region of a liquid crystal panel, the pixel region has m pixels arrayed in a matrix, m is an even number equal to or greater than 4, the in mask patterns have different arrangements of mask pixels in the basic region, and the number of the mask pixels is an even number smaller than m and equal to or greater than 2.

16 Claims, 14 Drawing Sheets

(51) Int. Cl.
*H04N 13/00* (2006.01)
*H04N 13/04* (2006.01)
*G09G 3/00* (2006.01)

(52) U.S. Cl.
CPC ...... *H04N 13/0033* (2013.01); *H04N 13/0438* (2013.01); *H04N 13/0486* (2013.01); *G09G 2310/0224* (2013.01); *G09G 2310/061* (2013.01)

(56) References Cited

U.S. PATENT DOCUMENTS

| | | | |
|---|---|---|---|
| 2006/0092164 A1 | 5/2006 | Takeuchi et al. | |
| 2007/0120794 A1* | 5/2007 | Shin et al. | 345/89 |
| 2008/0252586 A1 | 10/2008 | Cheng | |
| 2009/0237495 A1 | 9/2009 | Kawahara | |
| 2009/0267962 A1 | 10/2009 | Kim et al. | |
| 2010/0265222 A1* | 10/2010 | Tsuboi et al. | 345/205 |
| 2011/0001806 A1* | 1/2011 | Nakahata et al. | 348/56 |
| 2011/0298905 A1* | 12/2011 | Kim et al. | 348/54 |

FOREIGN PATENT DOCUMENTS

| | | |
|---|---|---|
| JP | 2006-39556 A | 2/2006 |
| jP | 2006-154751 A | 6/2006 |
| JP | 2009-232249 A | 10/2009 |
| JP | 2009-265603 A | 11/2009 |

OTHER PUBLICATIONS

Extended European Search Report in PCT/JP2011/063469 dated Jan. 30, 2014.

* cited by examiner

FIRST MASK $M_1$

SECOND MASK $M_2$

THIRD MASK $M_3$

FOURTH MASK $M_4$

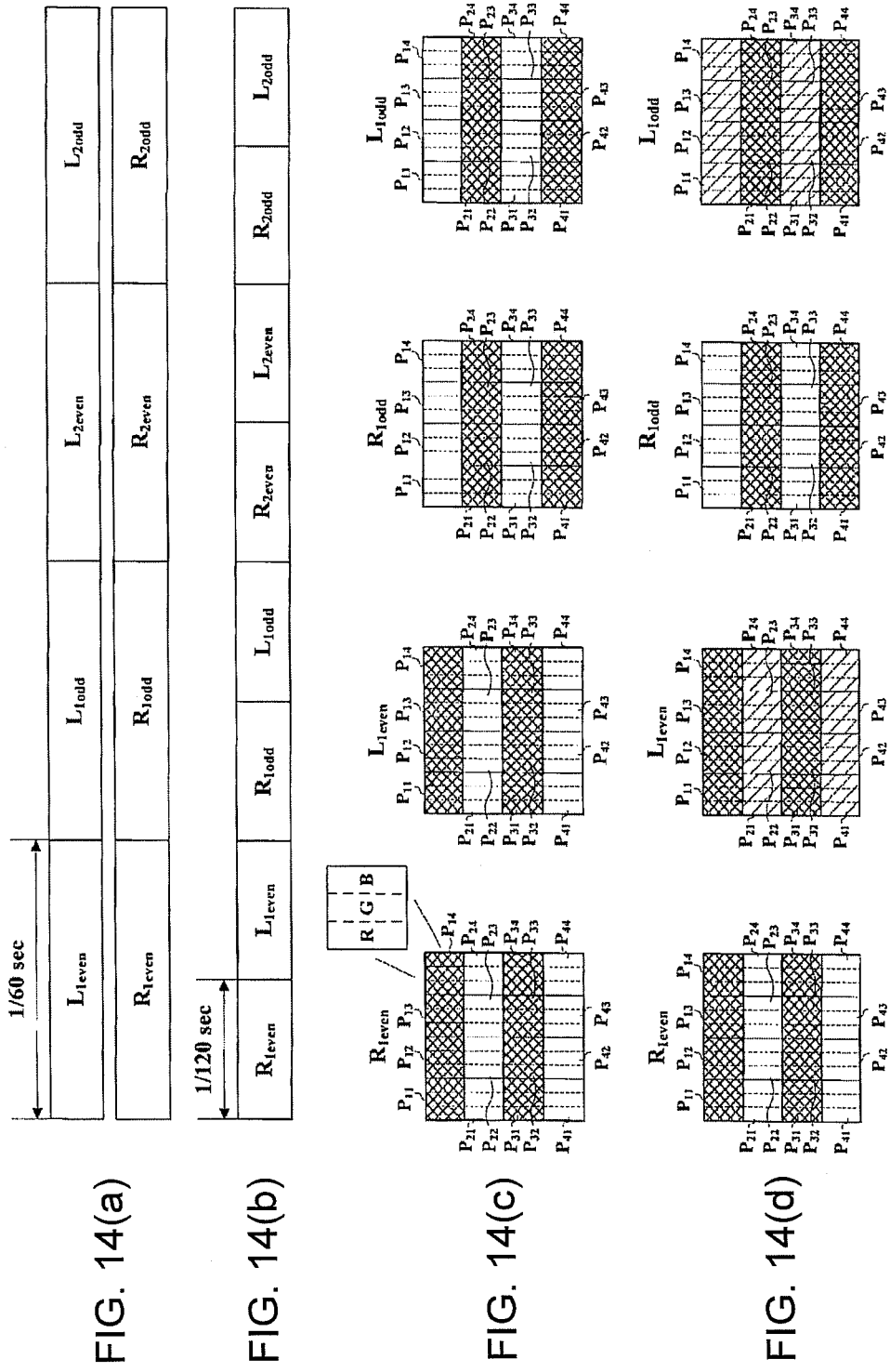

IMAGE DISPLAY METHOD AND LIQUID CRYSTAL DISPLAY DEVICE EMPLOYING SAME

RELATED APPLICATIONS

This is the U.S. national stage application which claims priority under 35 U.S.C. §371 to International Patent Application No PCT/JP2011/063469 filed on Jun. 13, 2011, which claims priority to Japanese Patent Application No. 2010-254974 filed on Nov. 15, 2010, the disclosures of which are incorporated by to reference herein their entireties.

TECHNICAL FIELD

The present invention relates to an image display method and an image display device, and specifically to an afterimage uniform display method for uniformly displaying afterimages and a liquid crystal display device employing the same.

BACKGROUND ART

A 3D liquid crystal display device is capable of displaying stereoscopic images by displaying left eye images and right eye images. There have been realized various methods for displaying the left eye images and the right eye images, and the methods fall into two broad categories: a space division type and a time division type. In the present specification, a time-division type 3D liquid crystal display device will be described.

The time-division type 3D liquid crystal display device alternately displays the left eye images and the right eye images, and there may be problems of cross-talk, in which the left eye image and the right eye image are mixed while one image is switched to another. The cross-talk means that when the left eye images and the right eye images are alternatively displayed, an image displayed one frame before appears as the afterimage until the liquid crystal has completely transited. In order to reduce the occurrence of the cross-talk, each of the received left eye images and right eye images is divided equal to or greater than 2 so as to increase the frame rate, and black images are inserted between the left eye divided images and the right eye divided images. However, when the black image corresponding to a complete one frame is inserted, the frame rate considerably degrades apparently. Thus, Patent Document 1 discloses a method of inserting the black image segments into parts of the displayed image.

Please refer to FIGS. 14(*a*) to 14(*d*). FIGS. 14(*a*) to 14(*d*) illustrate black insertion of time division type 3D image according to Patent Document 1. As shown in FIG. 14(*a*), when the liquid-crystal display device receives, in parallel, interlace signals having the frame rate of 60 Hz (left eye images L1even, L1odd, L2even, L2odd, . . . and right eye images R1even, R1odd, R2even, R2odd, . . . ), the speed of each of the left eye images and the right eye images is doubled to have the frame rate of 120 Hz. Then, R1even, L1even, R1odd, L1odd, . . . are alternately displayed (FIG. 14(*b*)).

FIG. 14(*c*) illustrates, as an example, the black insertion in the left eye images and the right eye images alternately displayed in a pixel region with four rows and four columns (4×4). Each of pixels P11 to P44 has three sub pixels with color filters (red (R), green (G), blue (B)). When the left eye image L1even is displayed, the pixels P11 to P14, P31 to P34 at odd-numbered lines are displayed in black, and when the left eye image L1odd is displayed, the pixels P21 to P24, P41 to P44 at even-numbered lines are displayed in black. Human eyes can perceive a left eye image L1 by combining the left eye image L1even where the pixels at the odd-numbered lines are displayed in black and the left eye image L1odd where the pixels at the even-numbered lines are displayed in black. Similarly to the case of the left eye image L1, for the case of the right eye image R1, by inserting black in the pixel at the odd-numbered lines and the even-numbered lines of the right eye images R1 even and R1 odd and by combining both images, the human eyes can perceive the right eye image R1.

PRIOR ART REFERENCE

Patent Document

Patent Document 1: JP-A-2000-050312

SUMMARY OF THE INVENTION

Problems to be Solved by the Invention

However, when the black is inserted based on the above method, there are generated pixels making lines that are displayed continuously over the left eye images and the right eye images. In FIG. 14(*d*), the pixels P21 to P24, P41 to P44 at the even-numbered lines of the left eye image L1 even and the pixels P11 to P14, P31 to P34 at the odd-numbered lines of the left eye image L1odd are continuously displayed when the display is changed from the right eye image to the left eye image. The afterimages are produced due to the change of the images at the pixels continuously displayed over both frames (the left eye image and the right eye image). Moreover, the afterimages are not produced at the right eye images R1even and R1odd, but are produced only at the left eye images L1even and L1odd. As a result, only the left eye perceives the afterimages.

The present invention is made in view of the above circumstances, and thereby it is an objective of the present invention to provide an image display method for uniformizing an afterimage caused by black insertion to each image when images of two types are alternately displayed, and to provide a liquid crystal display device employing the same.

Means for Solving the Problems

The present invention has the following configuration in order to achieve the above objectives.

In other words, the first invention according to the present invention is an image display method, wherein black insertion is provided to two types of video frames, the method including the steps of: defining basic regions in a pixel region of a liquid crystal panel, the basic region being a pixel region having m pixels arrayed in a matrix, wherein m is an even number equal to or greater than 4; setting the number of pixels subjected to black insertion in the basic region at an even number less than m and equal to or greater than 2; when the two types of the video frames are alternately displayed on the liquid crystal panel, sequentially providing m black display patterns to each of the basic regions for each frame, the m black display patterns having different arrangements of the pixels subjected to black insertion in the basic region; and repeating the sequentially providing of the m black display patterns in m-frame cycles, wherein: each of the pixels in the basic region is subjected to black insertion by the same number of times throughout the m black display patterns.

Above method is an image display method for inserting black when two types of video frames are alternately displayed. The basic region is a pixel region having m pixels arrayed in a matrix. The number m is an even number equal to or greater than 4. The number of the pixels subjected to black insertion in the basic region is set at an even number smaller than m and equal to or greater than 2. Furthermore, when the two types of the video frames are alternately displayed, m black display patterns are sequentially provided to each of the basic regions for each frame. The m black display patterns have different arrangements of the pixels subjected to black insertion in the basic region. The sequentially providing of the m black display patterns is repeated in m-frame cycles so that the m black display patterns are repeatedly provided while the two types of the video frames are displayed on the liquid crystal display panel.

According to the above method, even when the two types of the video frames are alternately displayed, the pixels, which continuously displayed over video frames, uniformly exist. Since the continuously displayed pixels uniformly exist, afterimages produced on the pixels are uniformly displayed on an entire liquid crystal panel. Since the afterimages are uniformly displayed over the two types of the video frames that are alternately displayed, the afterimages are evenly produced on both types of the video frames. Since the afterimages are uniformly displayed over space and time as above, it is possible to suppress the afterimages from being noticeable, and thereby, it is possible to reduce the afterimages the user perceives.

Also, each of the two types of the video frames may be divided, in a time division manner, into frames of an integral multiple equal to or greater than 2; the number m of the pixels in the basic region may be set at a double of the number of the divided frames; and when the divided frames of one of the two types of the video frames serving as odd-numbered frames and the divided frames of the other one of the video frames serving as even-numbered frames are alternately displayed, the m black display patterns in the basic region are sequentially provided to each of the basic regions for each frame.

The above method is an image display method of displaying video frames after increasing the frame rate by dividing each of the two types of the video frames, in a time division manner, into frames of an integral multiple equal to or greater than 2. In the above, by alternately displaying divided frames of one of the two types of the video frames serving as odd-numbered frames and divided frames of the other type serving as even-numbered frames, it is possible to alternately display the two types of the video frames having the increased frame rate. In the above case, the basic region is defined as the pixel region, in which the pixels of a double number of the divided frames are arrayed in a matrix. The number of the pixels subjected to black insertion in the basic region is set at an even number smaller than the double number of the divided frames and equal to or greater than 2. Furthermore, the pixels subjected to black insertion in the basic region have different arrangements over the divided frames of the alternately displayed two types of video frames.

In the above method, even when the divided frames of the two types of the video frames are alternately displayed, pixels, which are continuously displayed over both divided frames, uniformly exist. Since the continuously displayed pixels uniformly exist, the afterimages produced on the pixels are uniformly displayed on an entire liquid crystal panel. Since the afterimages are uniformly displayed in the alternately displayed divided frames of two types, the afterimages are produced evenly in both types of the video frames. Since the afterimages are uniformly displayed over space and time as above, it is possible to suppress the afterimages from being noticeable, and thereby, it is possible to reduce the afterimages the user perceives.

Also, in the image display method, each of the two types of the video frames is divided, in a time division manner, into frames of an even multiple equal to or greater than 4, wherein: the number m of the pixels in the basic region is 4; the number of the pixels subjected to black insertion in the basic region is 2; and when the divided frames of one of the two types of the video frames serving as odd-numbered frames and the divided frames of the other one of the video frames serving as even-numbered frames are alternately displayed, sequentially providing four black display patterns in the basic region to each of the basic regions for each frame.

When each of the two types of video frames is divided into frames of the even multiple equal to or greater than 4 in a time division manner, the total number of the divided frames of the two types become the multiple of 4. Thus, the basic region includes the four pixels arrayed in a matrix, and the number of the pixels subjected to black insertion in the basic region is set at 2. Since the two pixels subjected to black insertion in each of the basic regions have different arrangements over the continuous four divided frames that are alternately displayed, it is possible to uniformly display the afterimages over space and time for the continuous four frames. Since the total number of the two types of the divided frames is the multiple of 4, it is possible to uniformly display the afterimages for all the divided frames by repeating the above black insertion.

Also, each of the two types of the video frames may be divided, in a time division manner, into two frames, wherein the number m of the pixels in the basic region may be 4; and the number of the pixels subjected to black insertion in the basic region may be 2. In the above case, the basic region includes four pixels arrayed in a matrix. Since the number of the pixels subjected to black insertion in the basic region is 2, and the two pixels subjected to black insertion in each of the basic regions have different arrangements over the four divided frames, it is possible to uniformly display the afterimages over space and time for the four frames.

Also, each of the two types of the video frames may be divided, in a time division manner, into three frames, wherein: the number m of the pixels in the basic region may be 6; and the number of the pixels subjected to black insertion in the basic region may be 2. In the above case, the basic region includes six pixels arrayed in a matrix. Since the number of the pixels subjected to black insertion in the basic region is 2, and the two pixels subjected to black insertion in each of the respective basic regions have different arrangements over the six divided frames, it is possible to uniformly display the afterimages over space and time for the six frames.

Also, each of the two types of the video frames may be divided, in a time division manner, into three frames, wherein: the number m of the pixels in the basic region may be 6; and the number of the pixels subjected to black insertion in the basic region may be 4. In the above case, the basic region includes six pixels arrayed in a matrix. Since the number of the pixels subjected to black insertion in the basic region is 4, and the four pixels subjected to black insertion in each of the respective basic regions have different arrangements over the six divided frames, it is possible to uniformly display the afterimages over space and time for the six frames.

Also, the pixels subjected to black insertion in one of the basic regions are non-linearly arranged with the pixels subjected to black insertion in an adjacent one of the basic regions. Since the pixels subjected to black insertion are non-linearly arranged, it is possible to prevent noticeable flickers of a whole row or column from being displayed, and thereby limiting the flicker.

One of the two types of the video frames may be a left eye video frame, and the other one of the video frames may be a right eye video frame. Thus, in a 3D image display that increases the frame rate of the left eye video frame and the right eye video frame for alternately displaying the left eye video frame and the right eye video frame, it is possible to prevent afterimages from being unevenly produced in the video frame for one of eyes. As a result, it is possible to display 3D image with afterimages displayed uniformly over space and time.

Also, the second invention according to the present invention is a liquid crystal display device that includes: an alternate output unit that alternately outputs two types of video frames; a mask pattern storage unit that stores m mask patterns, wherein: basic regions are defined in a pixel region of a liquid crystal panel, the basic region being a pixel region having m pixels arrayed in a matrix, m being an even number equal to or greater than 4; and the m mask patterns have different arrangements of mask pixels in the basic region, the number of the mask pixels being an even number smaller than m and equal to or greater than 2; a mask pattern selection unit that sequentially selects each of the mask patterns; and a mask synthesizing unit that synthesizes the selected mask pattern on the video frame outputted from the alternate output unit, wherein: each of the pixels in the basic region is replaced by the mask pixel by the same number of times in the m mask patterns.

According to the above configuration, the alternate output unit alternately outputs two types of video frames. The mask pattern storage unit stores m mask patterns, wherein the basic regions are defined in a pixel region of a liquid crystal panel, the basic region being a pixel region having m pixels arrayed in a matrix, m is an even number equal to or greater than 4, the m mask patterns have different arrangements of mask pixels in the basic region, and the number of the mask pixels is an even number smaller than m and equal to or greater than 2. The mask pattern selection unit sequentially selects each of the mask patterns. The mask synthesizing unit synthesizes the selected mask pattern on the video frame outputted from the alternate output unit.

Thus, even when the two types of the video frames are alternately outputted, the pixels, which are continuously displayed over the video frames, uniformly exist on an entire image. Since the continuously displayed pixels uniformly exist, afterimages that are produced on the pixels are uniformly displayed on the entire image. Since the afterimages are uniformly displayed on the alternately displayed two types of video frames, it is possible to evenly produce the afterimages on both video frames. Since the afterimages are displayed uniformly over space and time as above, it is possible to suppress the afterimages from being noticeable, and thereby it is possible to reduce the afterimages the user can perceive.

Also, there is further provided a division unit that divides each of the received two types of the video frames into frames of an integral multiple equal to or greater than 2, wherein: the number m of the pixels in the basic region is a double of the number of the divided frames; and the alternate output unit alternately outputs each of the divided frames of the two types of the video frames.

The division unit divides each of the received two types of the video frames into frames of an integral multiple equal to or greater than 2, and the alternate output unit alternately outputs each of the divided frames of the two types of the video frames. Also, the mask pattern storage unit stores mask patterns of the number made by multiplying the number of the divided frames of the video frame by 2. The mask pattern selection unit sequentially selects the mask pattern. The mask synthesizing unit synthesizes the selected mask pattern on the divided frame outputted by the alternate output unit. In the above, the basic region is the pixel region having pixels arrayed in a matrix. The number of the pixels in the basic region is the double of the number of the divided frames of the video frame. The mask patterns have different arrangements of the mask pixels in the basic region, wherein the number of the mask pixels is the even number smaller than the total number of the pixels.

As a result, even when the divided frames of the two types of the video frames are alternately displayed, the continuously displayed pixels over the divided frames uniformly exist on the entire image. Since the continuously displayed pixels uniformly exist, the afterimages produced at the pixels are uniformly displayed on the entire image. Since the afterimages are also uniformly displayed on the alternately displayed two types of divided frames, the afterimage are evenly produced on both types of video frames. Since the afterimages are uniformly displayed over space and time as above, it is possible to suppress the afterimages from being noticeable, and thereby, it is possible to reduce the afterimages the user perceives.

Also, there is further provided a division unit that divides the received two types of the video frames into frames of even multiple equal to or greater than 4, wherein the number m of the pixels in the basic region is 4, and the alternate output unit alternately outputs each of the divided frames of the two types of the video frames.

When each of the two types of the video frames is divided, in a time division manner, into frames of an even multiple equal to or greater than 4, the total number of the resulting two types of the divided frames is a multiple of 4. In the above case, the basic region for the mask pattern includes four pixels arrayed in a matrix, and the number of the mask pixels in the basic region is set at 2. Then, there are stored four types of mask patterns having different arrangements of two mask pixels in the basic region. Since the total number of the two types of the divided frames is the multiple of 4, by sequentially repeatedly synthesizing the four types of the mask patterns, it is possible to uniformly display the afterimages on all the divided frames over space and time.

The basic region may be a pixel region of a matrix with two rows and two columns; and the mask pattern storage unit may store four mask patterns having different arrangements of two mask pixels in the basic region.

Due to the above configuration, the mask pattern storage unit stores the four mask patterns having different arrangements of the mask pixels. As a result, each of the two types of the video frames is divided, in a time division manner, into two frames. In the above case, the basic region includes four pixels arrayed in a matrix with two rows and two columns. Since the number of the pixels subjected to black insertion in the basic region is 2, and the two pixels subjected to black insertion in each of the basic regions have different arrangements over the four frames, it is possible to uniformly display the afterimages over space and time for the four frames.

Also, the basic region may be a pixel region of a matrix with two rows and three columns or of a matrix with three rows and two columns; and the mask pattern storage unit may store six mask patterns having different arrangements of two mask pixels in the basic region.

According to the above configuration, since the mask pattern storage unit stores the six mask patterns having different arrangements of the mask pixels, each of the two types of the video frames is divided into three frames in a time division manner. In the above case, the basic region includes six pixels arrayed in a matrix with two rows and three columns or in a matrix with three rows two columns. Since the number of pixels subjected to black insertion in the basic region is 2, and the two pixels subjected to black insertion in each of the basic regions have different arrangements over the six frames, it is possible to uniformly display the afterimages over space and time for the six frames.

Also, the basic region may be a pixel region of a matrix with two rows and three columns or of a matrix with three rows and two columns; and the mask pattern storage unit stores six mask patterns having different arrangements of four mask pixels in the basic region.

According to the above configuration, since the mask pattern storage unit stores the six mask patterns having different arrangements of the mask pixels, the two types of the video frames is divided into three frames in a time division manner. In the above case, the basic region includes six pixels arrayed in a matrix with two rows and three columns or in a matrix with three rows two columns. Since the number of pixels subjected to black insertion in the basic region is 4, and the four pixels subjected to black insertion in each of the basic regions have different arrangements over the six frames, it is possible to uniformly display the afterimages over space and time for the six frames.

Also, the mask pixels in one of the basic regions are non-linearly arranged with the mask pixels in an adjacent one of the basic regions. Due to the above configuration, the pixels subjected to black insertion are non-linearly arranged, and thereby it is possible to prevent noticeable flickers of a whole row or column from being displayed, and thereby limiting the flicker.

Also, in the present invention, one of the two types of the video frames is a left eye video frame, and the other one of the video frames is a right eye video frame. Due to the above, it is possible to uniformly produce the afterimages even in the 3D image.

Effect of the Invention

According to the present invention, when two types of images are alternately displayed, it is possible to uniformize afterimages caused by black insertion to each of the images.

BRIEF DESCRIPTION OF THE DRAWINGS

FIGS. 14(a) to 14(d) are explanatory diagrams explaining images subjected to black insertion according to a conventional example.

EMBODIMENTS FOR CARRYING OUT THE INVENTION

First Embodiment

Figure 1:
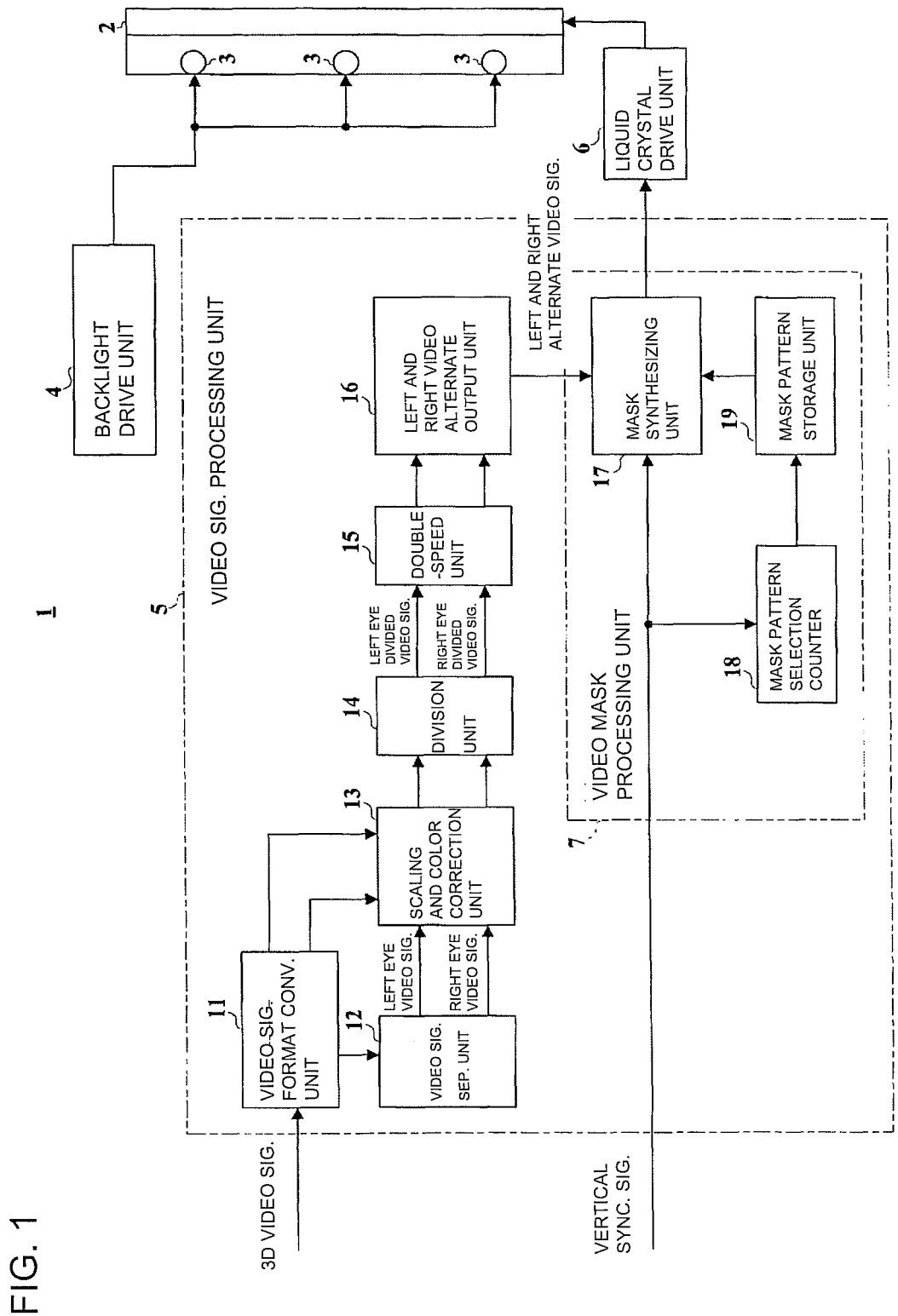
FIG. 1 is a block diagram illustrating a schematic configuration of a liquid crystal display device according to the first embodiment.

The first embodiment of the present invention will be described below with reference to drawings. FIG. 1 is a block diagram illustrating a schematic configuration of a liquid crystal display device, and FIG. 2 is an explanatory diagram explaining the increase in a frame rate.

1. Schematic Configuration of Liquid Crystal Display Device

As shown in FIG. 1, a liquid crystal display device 1 includes a liquid crystal panel 2, a backlight 3 that emits light from a back side of the liquid crystal panel 2, a backlight drive unit 4 that controls drive of the backlight 3, a video signal processing unit 5 that processes received 3D video signals in various manners, and a liquid crystal drive unit 6 that drives a liquid crystal of the liquid crystal panel 2 based on the processed video signals.

In the present embodiment, the liquid crystal panel 2 employs an active-matrix liquid crystal display panel having thin-film transistors (TFT). The liquid crystal panel 2 has a large amount of pixels, each of which has three sub pixels having color filters (red (R), green (G), blue (B)), and which are arrayed in a matrix. The backlight 3 employs a cold-cathode fluorescent lamp (CCFL) in the present embodiment. The backlight 3 may employ a light emitting diode (LED) or a lamp other than the cold-cathode fluorescent lamp. The liquid crystal display device 1 may include multiple backlights 3 or may include only one backlight 3. The backlight drive unit 4 controls luminosity of the backlight.

The liquid crystal drive unit 6 controls voltage applied to the thin-film transistor provided to each pixel of the liquid crystal panel 2. The liquid crystal drive unit 6 controls the voltage applied to the liquid crystal of each pixel based on video signals transmitted by the video signal processing unit 5 to control an amount of light that passes through each pixel. As a result, the liquid crystal drive unit 6 causes the liquid crystal panel 2 to display left eye images and right eye images on the liquid crystal panel 2.

2. Configuration of Video Signal Processing Unit

The video signal processing unit 5 includes a video signal format conversion unit 11, a video signal separating unit 12, a scaling and color correction unit 13, a division unit 14, a double-speed unit 15, a left and right video alternate output unit 16, and a video mask processing unit 7. The video signal processing unit 5 generates left eye video signals and right eye video signals in a time division manner based on received 3D video signals, and then synthesizes mask patterns on the video signals to output the signals to the liquid crystal drive unit 6. The video signal processing unit 5 includes a micro processor and a memory.

The video signal format conversion unit 11 converts the received time-division 3D video signals into 3D video signals with an appropriate format so as to enable the liquid crystal panel 2 to display the images. The video signal format conversion unit 11 counters various formats of the received 3D video signals (such as HDMI format, simultaneous input, side by side input, interleave input). In the first embodiment, it is assumed that the received 3D video signals are progressive signals. In a case, where the received 3D video signals are interlace signals, the video signal format conversion unit 11 performs IP conversion for converting the interlace signals into the progressive signals. The format-converted 3D video signals are outputted to the video signal separating unit 12.

In the first embodiment, the left eye video signals and the right eye video signals are inputted into the video signal format conversion unit as the time-division 3D video signals. However, alternatively, the left eye video signals and the right eye video signals may be inputted in parallel into the video signal format conversion unit 11 as the 3D video signals. In the above case, the 3D video signals including the format-converted left eye video signals and right eye video signals are outputted in parallel to the scaling and color correction unit 13.

The video signal separating unit 12 receives the time-division 3D video signal for each frame and separates the left eye video signal from the right eye video signal and outputs the left eye video signal and the right eye video signal. Note that, the left eye video signal for one frame is indicated as a left eye video frame, and the right eye video signal for one frame is indicated as a right eye video frame. When discrimination between the left eye video signals and the right eye video signals is not required in description, both video signals are indicated as video signals. When discrimination between the left eye video frame and the right eye video frame is not required in description, the both video frames are indicated as video frames.

The scaling and color correction unit 13 executes scaling and color correction for each of received video signals. The scaling operation converts, for example, video signals having a screen size of 4:3 into video signals having a screen size of 16:9, and vice versa. The color correction operation corrects the tone of the received video signals.

The division unit 14 divides the left eye video frames and the right eye video frames into a predefined number of frame segments. For example, in a case, where the frame rate is 30 Hz and thus each of the left eye video signals and the right eye video signals corresponds to a format of 30 frames per second, if the time for displaying one frame is halved to have two frames in the original display time so as to increase the frame rate to 60 Hz, each of the left eye video signals and the right eye video signals corresponds to a format of 60 frames per second.

Figure 2A:
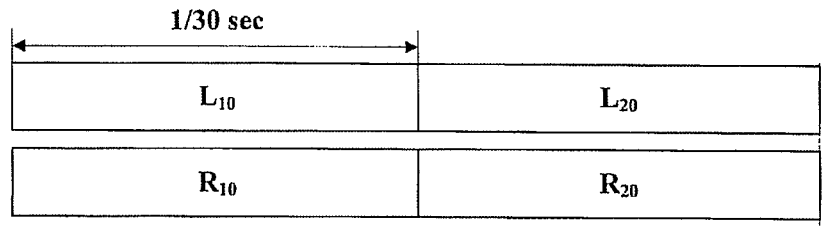
FIGS. 2(a) to 2(e) are explanatory diagrams explaining the increase in a frame rate according to the first embodiment.
Figure 2B:
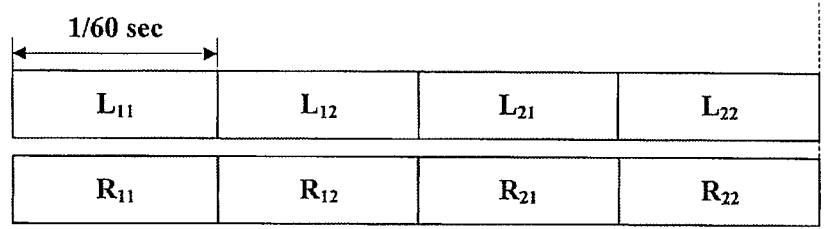
Figure 2C:
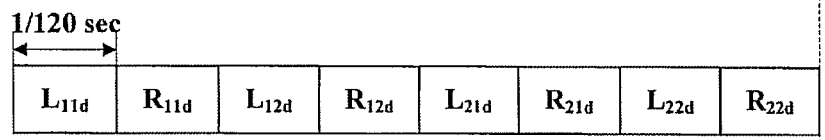
Figure 2D:
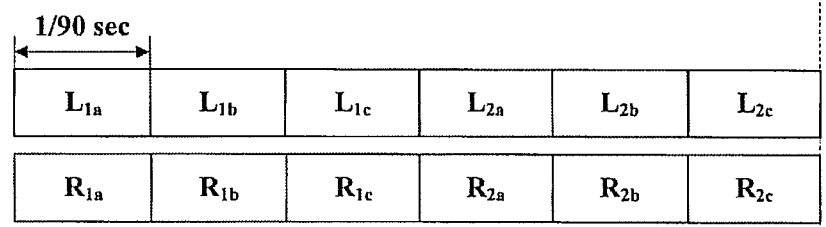
Figure 2E:
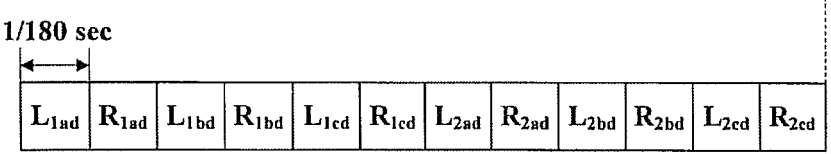

When the video frame is divided as above, a received left eye video frame L10 is divided into left eye divided video frames L11 and L12, and a right eye video frame R10 is divided into right eye divided video frames R11 and R12 as shown in FIGS. 2(a) and 2(b). Alternatively to the above, as shown in FIG. 2(d), the time for displaying the received one frame may be reduced to have three frames in the original display time so as to increase the frame rate to 90 Hz, which is triple of the original frame rate. Therefore, each of the left eye video frame and the right eye video frame corresponds to a format of 90 frames per second. In addition, the time for displaying the received one frame may be reduced to have four frames in the original display time so as to increase the frame rate to 120 Hz, which is quadruple of the original display time. Therefore, each of the left eye video frames and the right eye video frames corresponds to a format of 120 frames per second. The above left eye divided video frames L11, L12, L21, L22, ... and the right eye divided video frames R11, R12, R21, R22, ... are outputted to the double-speed unit 15. Note that when the video frame is divided, correction, such as motion compensation, may be executed to the divided frames.

The double-speed unit 15 doubles the frame rate of the received video frames. In other words, the left eye divided video frames L11, L12, L21, L22, ... and the right eye divided video frames R11, R12, R21, R22, ... having the frame rate of 60 Hz are respectively converted into left eye divided double-speed video frames L11d, L12d, L21d, L22d, ... and right eye divided double-speed video frames R11d, R12d, R21d, R22d, having the frame rate of 120 Hz as shown in FIG. 2(c). Also, the left eye divided video frames and the right eye divided video frames having the frame rate of 90 Hz, 120 Hz are respectively converted into video frames having the frame rate of 180 Hz, 240 Hz. Each of the left eye video frames and the right eye video frames, the frame rates of which have been doubled, are independently outputted to the left and right video alternate output unit 16.

The left and right video alternate output unit 16 alternately arranges, as shown in FIG. 2(c), the left eye divided double-speed video frames and the right eye divided double-speed video frames transmitted by the double-speed unit 15, and outputs the individual frame to a mask synthesizing unit 17 as a left and right alternate video signal. The left and right video alternate output unit 16 corresponds to an alternate output unit of the present invention.

3. Configuration of Video Mask Processing Unit 7

The video mask processing unit 7 includes the mask synthesizing unit 17, which synthesizes mask patterns on the video frames, a mask pattern selection counter 18, which selects the mask pattern based on a vertical synchronization signal, and a mask pattern storage unit 19, which stores the mask pattern to be synthesized on the frames.

The mask pattern selection counter 18 selects and retrieves one of the multiple mask patterns stored in the mask pattern storage unit 19 based on a value of a counter, and outputs the retrieved pattern to the mask synthesizing unit 17. The mask pattern selection counter 18 selects a mask pattern having the frame rate, which has been increased by the division unit 14 and the double-speed unit 15, based on a received vertical synchronization signal. The value of the counter is increased (or incremented) by one every time the mask pattern is retrieved from the mask pattern storage unit 19. When the value of the counter reaches a predefined limitation value, the value of the counter is reset to an initial value.

The mask pattern storage unit 19 stores therein a predetermined number of mask patterns that are to be synthesized on the displayed video frames. The predetermined number relates to the number of frames divided by the division unit 14, and is a double number of the divided frames. The mask pattern storage unit 19 includes a memory.

The mask pattern storage unit 19 stores therein the mask patterns of the number that corresponds to the double number of the divided frames. In other words, in a case, where each of the left eye and right eye video frames is divided into two frames as shown in FIG. 2(b), four mask patterns are needed. Alternatively, in another case, where each of the left eye and right eye video frames is divided into three frames as shown in FIG. 2(d), six mask patterns are needed.

Figure 3:
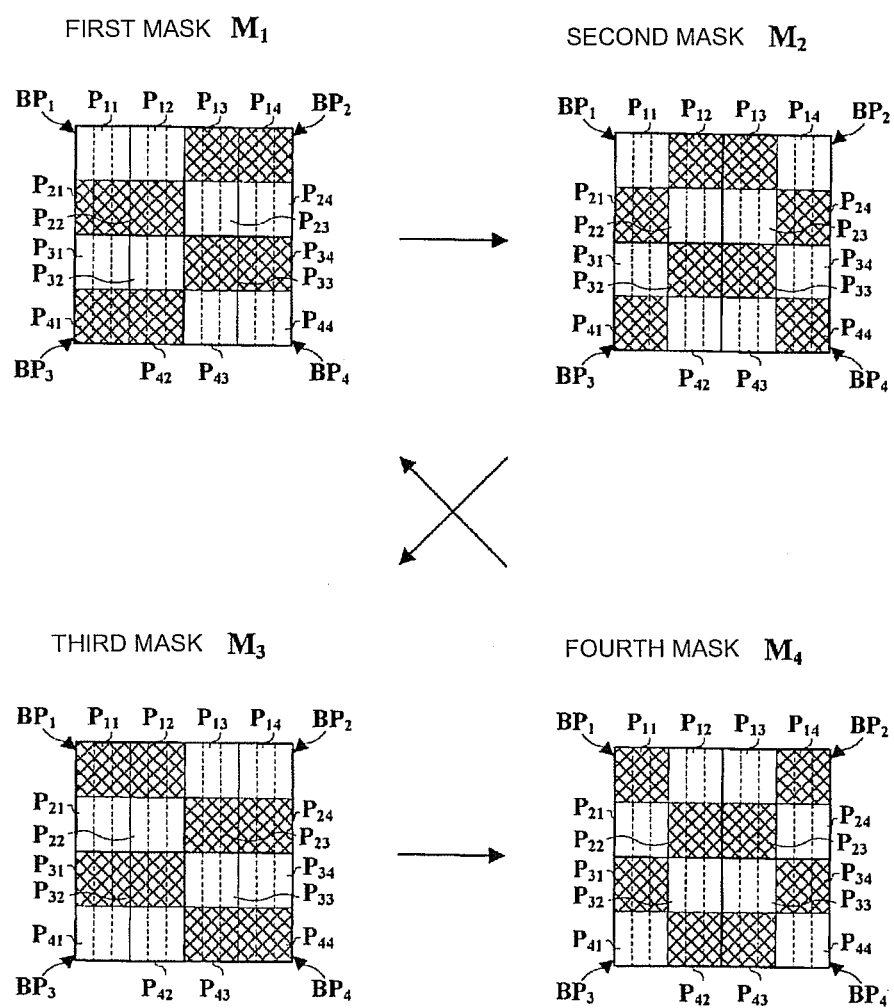
FIG. 3 is an explanatory diagram explaining mask patterns according to the first embodiment.

Firstly, a case that the number of the divided frames is 2 will be described with reference to FIG. 3. FIG. 3 is an explanatory diagram explaining the mask patterns according to the embodiment. FIG. 3 illustrates four mask patterns (a first mask M1 to a fourth mask M4). Although each of the mask patterns is illustrated to have pixels with four rows and four columns (4×4), the number of the pixels in the mask pattern, actually, corresponds to the number of the pixels arranged on the liquid crystal panel 2. Also, each mask pattern is divided into basic regions each having pixels with two rows and two columns (2×2). In other words, a basic region BP1 includes a pixel P11, a pixel P12, a pixel P21, and a pixel P22. In addition to the above, a basic region BP2 includes a pixel P13, a pixel P14, a pixel P23, and a pixel P24. A basic region BP3 includes a pixel P31, a pixel P32, a pixel P41, and a pixel P42. A basic region BP4 includes a pixel P33, a pixel P34, a pixel P43, and a pixel P44.

Each of the four mask patterns (the first mask M1 to the fourth mask M4) defines mutually different mask pattern of each of the basic regions BP1 to BP4. Mask pixels in the basic region BP1 of the first mask M1 are the pixel P21 and the pixel P22 while mask pixels in the basic region BP1 of the second mask M2 are the pixel P21 and the pixel P12. In other words, when the mask pattern is updated to a next pattern, one of the two mask pixels in the basic region BP1, the pixel P21, is unchanged in both patterns, and the other one of the mask pixels changes from the pixel P22 to the pixel P12. Similarly, when the mask pattern is updated from the second mask M2 to the third mask M3, one of the two mask pixels in the basic region BP1, the pixel P12, is unchanged in both patterns, and the other one of the mask pixels changes from the pixel P21 to the pixel P11. Also, when the mask pattern is updated from the third mask M3 to the fourth mask M4, one of the two mask pixels in the basic region BP1, the pixel P11, is unchanged in both patterns, and the other one of the mask pixels changes from the pixel P12 to the pixel P22. Similarly, when the mask pattern is updated from the fourth mask M4 to the first mask M1, one of the two mask pixels in the basic region BP1, the pixel P22, is unchanged in both patterns, and the other one of the mask pixels changes from the pixel P11 to the pixel P21.

Each of the basic regions BP1 to BP4 has two mask pixels therein. Furthermore, four mask pixels are not linearly arranged in series over the basic regions BP1 to BP4 in any one of the mask patterns (the first mask M1 to the fourth mask M4). Due to the above, a black straight line will not appear on the liquid crystal panel 2.

Figure 4:
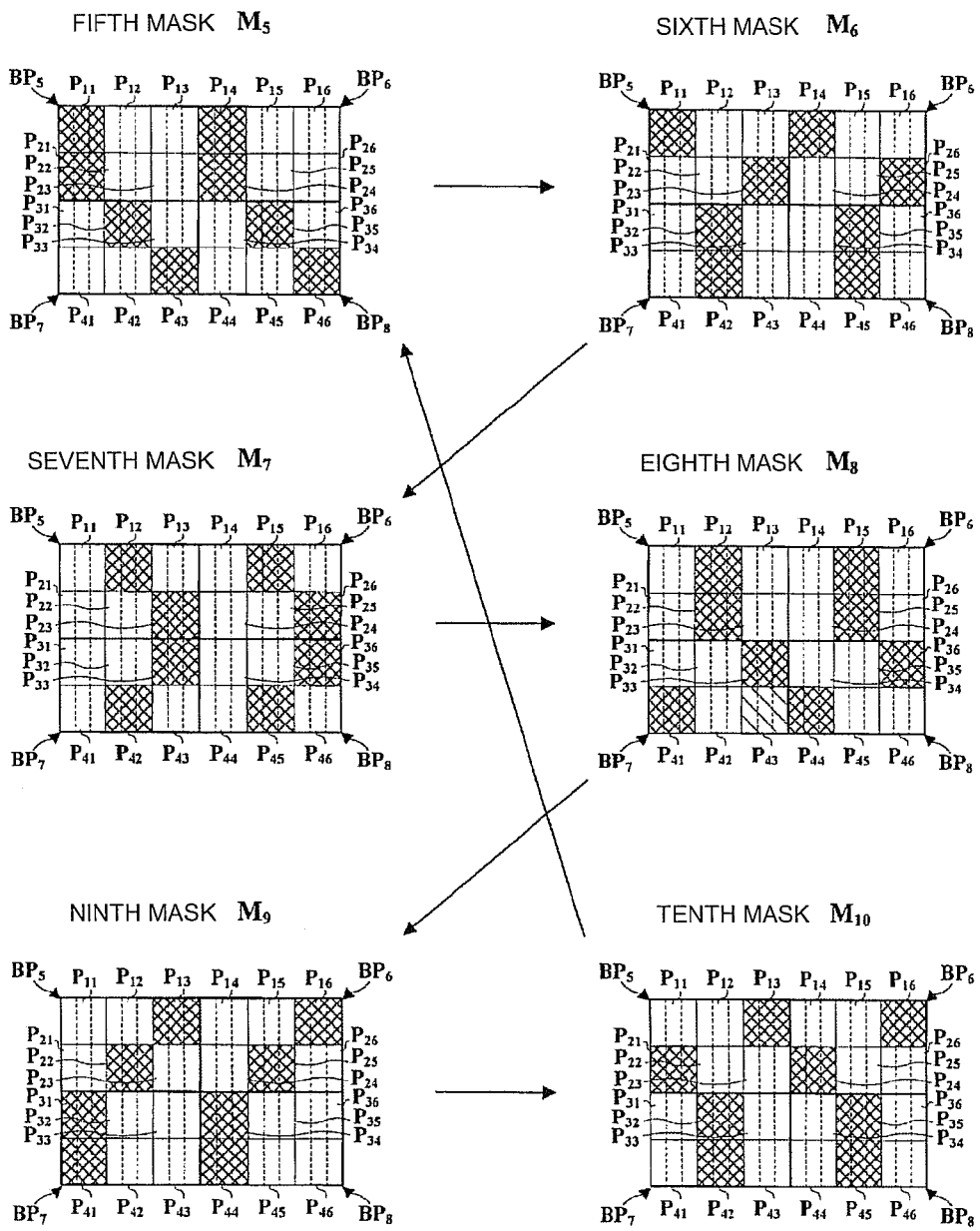
FIG. 4 is an explanatory diagram explaining mask patterns according to the first embodiment.

Next, a case that the number of the divided frames is 3 will be described. When the number of the divided frames is 3, a basic region of each mask pattern has pixels with two rows and three columns (2×3). Furthermore, the number of the mask pixels in each basic region is 2 for one case and 4 for another case. FIG. 4 illustrates six mask patterns (a fifth mask M5 to a tenth mask M10) having three divided frames and two mask pixels. Although each of the mask patterns is illustrated, as an example, to have pixels of four rows and six columns (4×6), the number of the pixels in the mask pattern actually corresponds to the number of the pixels arrayed on the liquid crystal panel 2. Each mask pattern is divided into basic regions, each having pixels of two rows and three columns (2×3). In other words, a basic region BP5 includes the pixel P11 to the pixel P13 and the pixel P21 to the pixel P23. In addition, a basic region BP6 includes the pixel P14 to a pixel P16 and the pixel P24 to a pixel P26. A basic region BP7 includes the pixel P31 to the pixel P33 and the pixel P41 to the pixel P43. A basic region BP8 includes the pixel P34 to a pixel P36 and the pixel P44 to a pixel P46.

Each of the six mask patterns (the fifth mask M5 to the tenth mask M10) defines mutually different mask pattern of each of the basic regions BP5 to BP8. The mask pixels of the basic region BP5 are the pixel P11 and the pixel P21 in the fifth mask M5, while the mask pixels of the basic region BP5 in the sixth mask M6 are the pixel P11 and the pixel P23. In other words, when the mask pattern is updated to a next mask pattern, one of the two mask pixels in the basic region BP5, the pixel P11, is unchanged in both patterns, and the other one of the mask pixels changes from the pixel P21 to the pixel P23. Similarly, when the mask pattern is updated from the sixth mask M6 to the seventh mask M7, one of the two mask pixels in the basic region BP5, the pixel P23, is unchanged in both patterns, and the other one of the mask pixels changes from the pixel P11 to the pixel P12. Similarly, when the mask pattern is updated from the seventh mask M7 to the eighth mask M8, one of the two mask pixels in the basic region BP5, the pixel P12, is unchanged in both patterns, and the other one of the mask pixels changes from the pixel P23 to the pixel P22. When the mask pattern is updated from the eighth mask M8 to the ninth mask M9, when the mask pattern is updated from the ninth mask M9 to the tenth mask M10, or when the mask pattern is updated from the tenth mask M10 to the fifth mask M5, one of the two mask pixels in the basic region BP5 is unchanged in both patterns, and the other one of the mask pixels changes from one pixel to another.

Figure 5:
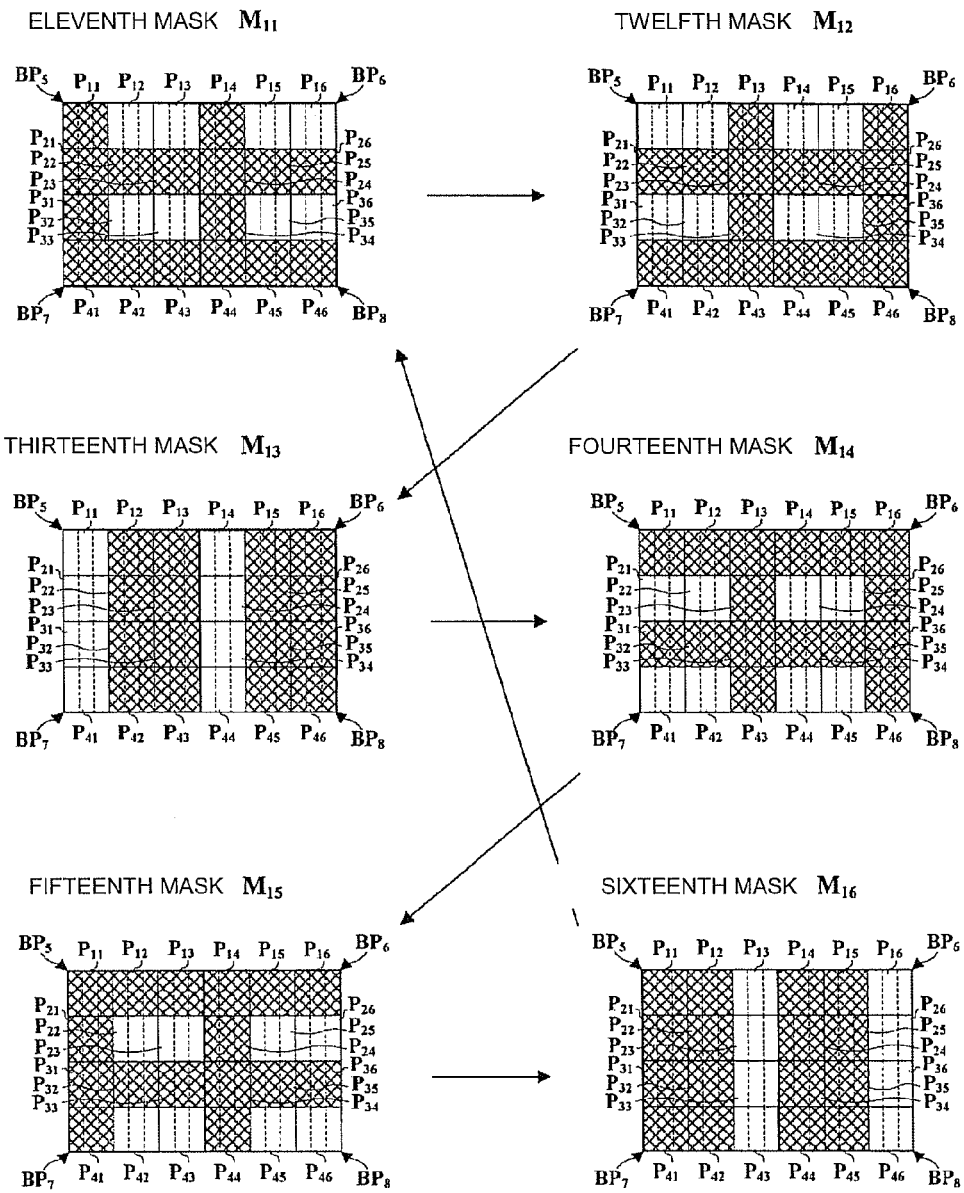
FIG. 5 is an explanatory diagram explaining mask patterns according to the first embodiment.

FIG. 5 illustrates the six mask patterns M11 to M16 for an example case having three divided frames and four mask pixels. Each of the six mask patterns (the eleventh mask M11 to the sixteenth mask M16) defines mutually different mask pattern of each of the basic regions BP5 to BP8. The mask pixels of the basic region BP5 in the eleventh mask M11 are the pixel P11 and the pixels P21 to P23, while the mask pixels of the basic region BP5 in the twelfth mask M12 are the pixel P13 and the pixels P21 to P23. In other words, when the mask pattern is updated to a next pattern, three of the four mask pixels in the basic region BP5, the pixels P21 to P23, are unchanged in both patterns, and one of the mask pixels is changed from the pixel P11 to the pixel P13. Similarly, when the mask pattern is updated from the twelfth mask M12 to the thirteenth mask M13, three of the four mask pixels in the basic region BP5, the pixels P13, P22, P23, are unchanged in both patterns, and one of the mask pixels is changed from the pixel P21 to the pixel P12. Also, when the mask pattern is updated from the thirteenth mask M13 to the fourteenth mask M14, three of the four mask pixels in the basic region BP5, the pixels P12, P13, P23, are unchanged in both patterns, and one of the mask pixels is changed from the pixel P22 to the pixel P11. When the mask pattern is updated from the fourteenth mask M14 to the fifteenth mask M15, when the mask pattern is updated from the fifteenth mask M15 to the sixteenth mask M16, or when the mask pattern is updated from the sixteenth mask M16 to the eleventh mask M11, three of the four mask pixels in the basic region BP5 are unchanged in both patterns, and one of the mask pixels is changed from one pixel to another.

As above, even when the number of the divided frames is 2, 3, or more, the number of the pixels within the basic region of the mask pattern is a double of the number of the divided frames. In other words, the number of the pixels within the basic region of the mask pattern is an even number equal to or greater than 4. Also, the number of the mask pixels within the basic region is less than the total number of the pixels within the basic region and is an even number equal to or greater than 2. When the above condition is satisfied, it is possible to mutually differentiate the mask patterns for the basic regions over the frames of the double number of the divided frames.

The mask synthesizing unit 17 synthesizes the mask pattern on the received video frame. In other words, the mask synthesizing unit 17 synthesizes the mask pattern transmitted by the mask pattern storage unit 19 on the left and right alternate video signal of one frame outputted by the left and right video alternate output unit 16. The resulting video signal is transmitted to the liquid crystal drive unit 6. The mask pattern storage unit 19 sequentially transmits the mask pattern synchronously with the left eye video frame and the right eye video frame that are alternately transmitted by the left and right video alternate output unit 16, and the mask pattern is synthesized on the each of the frame. Therefore, each of the left eye video frames and the right eye video frames is not required to be associated with the corresponding mask pattern. The liquid crystal drive unit 6 controls the liquid crystal panel based on the video signal having the mask pattern synthesized thereon so as to display the left eye image and the right eye image in a time division manner.

4. Description of Operation

Figure 6:
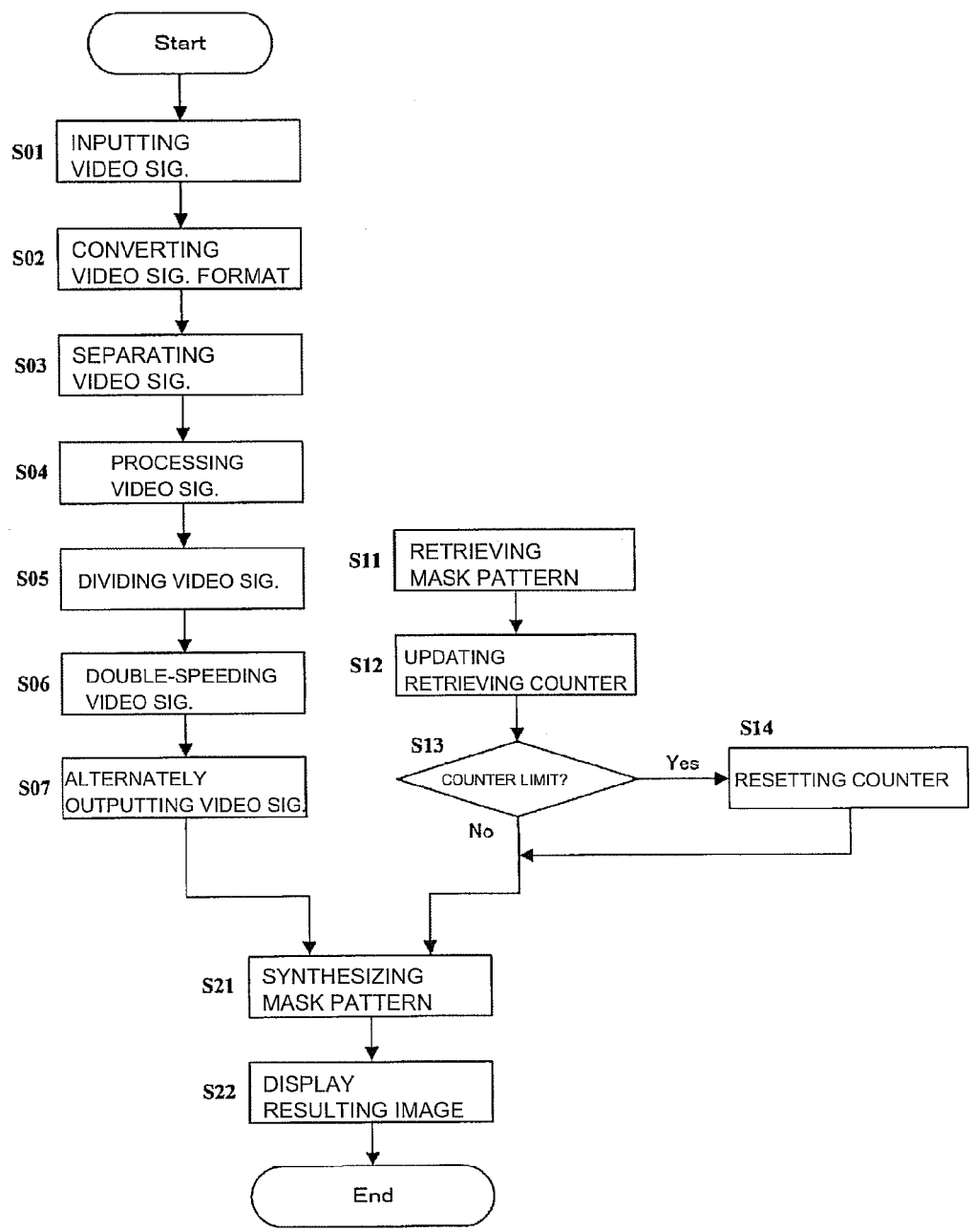
FIG. 6 is a flow chart diagram illustrating procedure of a video signal process according to the first embodiment.

Next, procedure of a masking process for the received 3D video signal will be described with reference to a flow chart illustrated in FIG. 6. Note that, description will be given below to a case that the number of the divided frames is 2. FIG. 6 is a flow chart diagram illustrating procedure of processing the 3D video signals.

Firstly, the 3D video signals for one frame are inputted to the video signal processing unit 5 (step S01). When the 3D video signals are received, the video signal format conversion unit 11 converts the format of the received 3D video signals into a format that is displayable on the liquid crystal display panel 2 (step S02). For example, in a case, where the received 3D video signals are the interlace signals, the received 3D video signals are converted into the progressive signals.

The video signal separating unit 12 receives the format-converted 3D video signals and separates the left eye video signals, which constitute the left eye video frames, from the right eye video signals, which constitute the right eye video frames (step S03).

The scaling and color correction unit 13 executes video processing for the separated left eye video signals and right eye video signals (step S04). In the above video processing, the scaling and color are corrected. Each of the left eye video frames and the right eye video frames, which has been executed with the scaling and color correction, is divided into two frames by the division unit 14 (step S05).

The speeds of the divided left eye video frames and right eye video frames are doubled (step S06), and each frame is outputted from the left and right video alternate output unit 16 (step S07). Thus, the left eye video frames and the right eye video frames are alternately outputted in a time division manner.

In parallel to the above video signal processing, the mask pattern selection counter 18 retrieves one mask pattern, which corresponds to the value of the counter, out of the four types of the mask patterns (the first mask M1 to the fourth mask M4) stored in the mask pattern storage unit 19 and outputs the mask pattern to the mask synthesizing unit 17 (step S11). Based on the received vertical synchronization signal, the mask pattern selection counter 18 selects the mask pattern, which corresponds to the value of the counter, from the mask patterns stored in the mask pattern storage unit 19 in synchronization with the frame rate, which have been increased through the division process and the double-speed process. In other words, the mask pattern to be selected is updated for each increased frame rate.

The selected mask pattern is transmitted to the mask synthesizing unit 17. Every time the mask pattern is selected, the counter is incremented by 1 and updated (step S12). When the value of the counter is incremented, it is determined whether the value of the counter reaches the limitation value (step S13). When it is determined that the value reaches the limitation value, the value of the counter is reset (step S14). For example, in a case that the number of the divided frames is 2, the mask pattern, which corresponds to the value of the counter, is selected among the four types of the first mask M1 to the fourth mask M4 stored in the mask pattern storage unit 19. The value of the counter may be an integer ranging from 1 to 5, and the counter value 1 corresponds to the first mask M1, the counter value 2 corresponds to the second mask M2, the counter value 3 corresponds to the third mask M3, and the counter value 4 corresponds to the fourth mask M4, respectively. When the counter value is 5, it is determined that the counter value reaches the limitation value, and the counter value is reset to 1. As a result, the selected mask pattern is the first mask M1, which is the first one in the sequence. As above, the first mask M1 to the fourth mask M4 are selected in a sequential order in a cyclic manner. Note that if the number of the divided frames is 3, the value of the counter may be an integer ranging from 1 to 7, and the counter value 7 corresponds to the limitation value. In the above condition, each of the masks is associated with the counter value.

When the mask synthesizing unit 17 retrieves the mask pattern, the mask synthesizing unit 17 synthesizes a mask image on the left and right alternate video signals outputted by the left and right video alternate output unit (step S21), and transmits the resulting signals to the liquid crystal drive unit 6 based on the vertical synchronization signals. Due to the above, black insertion is uniformly provided to the left eye divided images and the right eye divided images, and thereby it is possible to display images with uniformed afterimages on the liquid crystal panel 2 (step S22).

Figure 7:
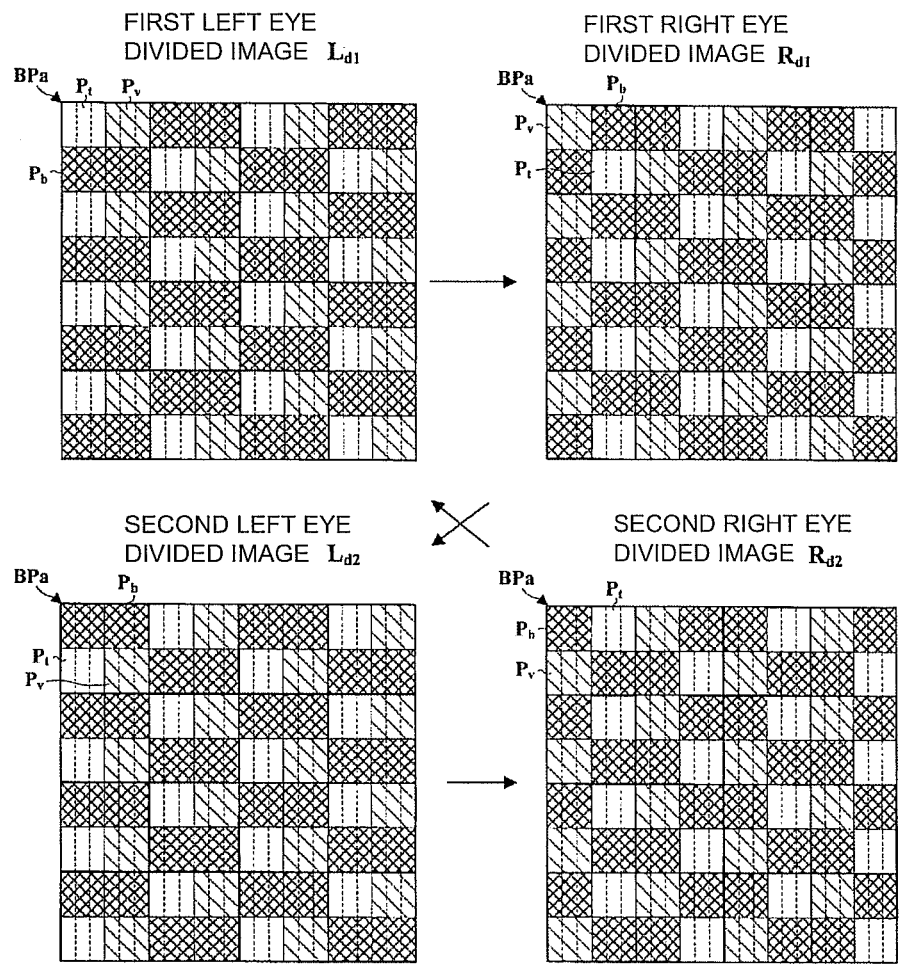
FIG. 7 is an explanatory diagram illustrating images subjected to black insertion according to the first embodiment.
Figure 8:
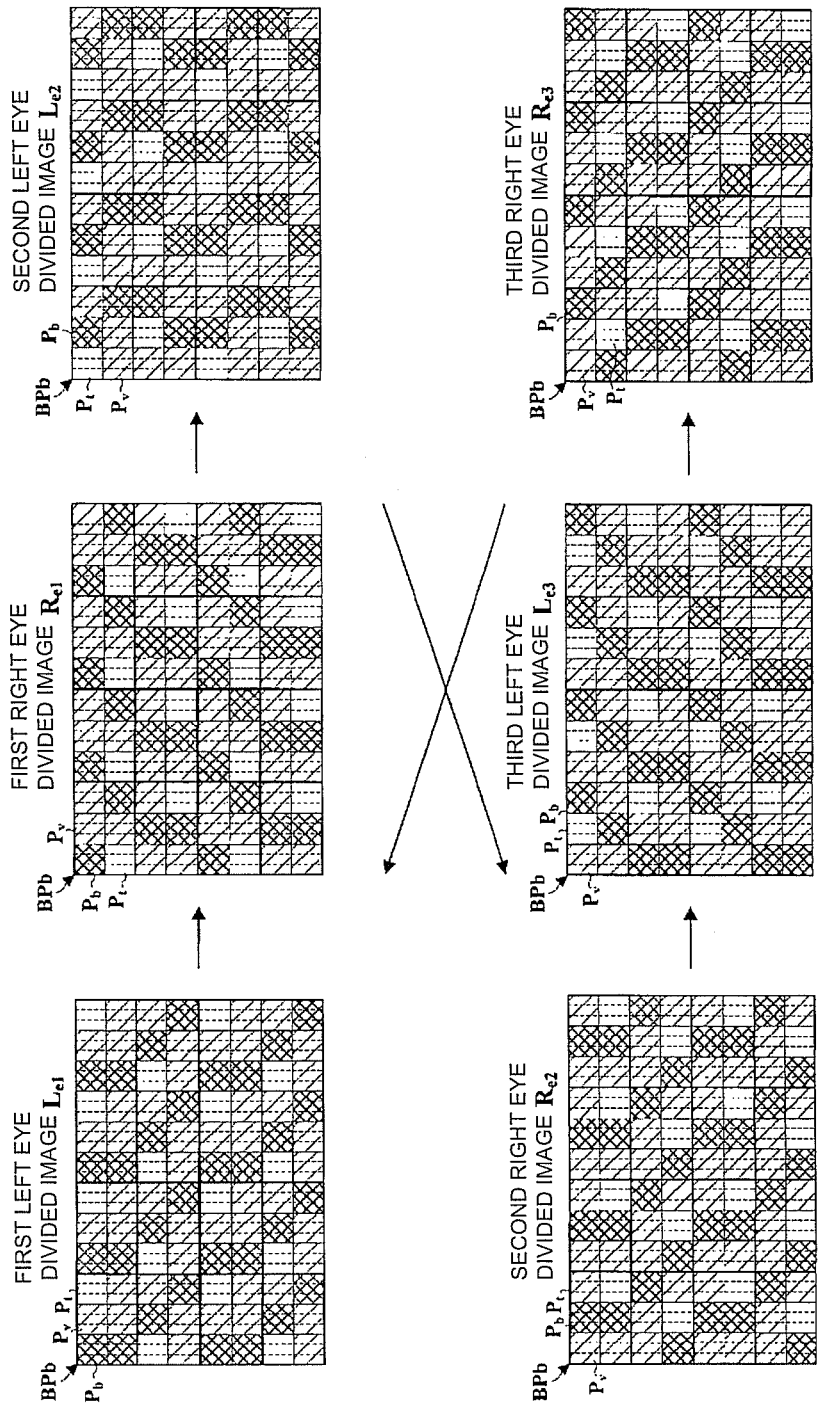
FIG. 8 is an explanatory diagram illustrating images subjected to black insertion according to the first embodiment.
Figure 9:
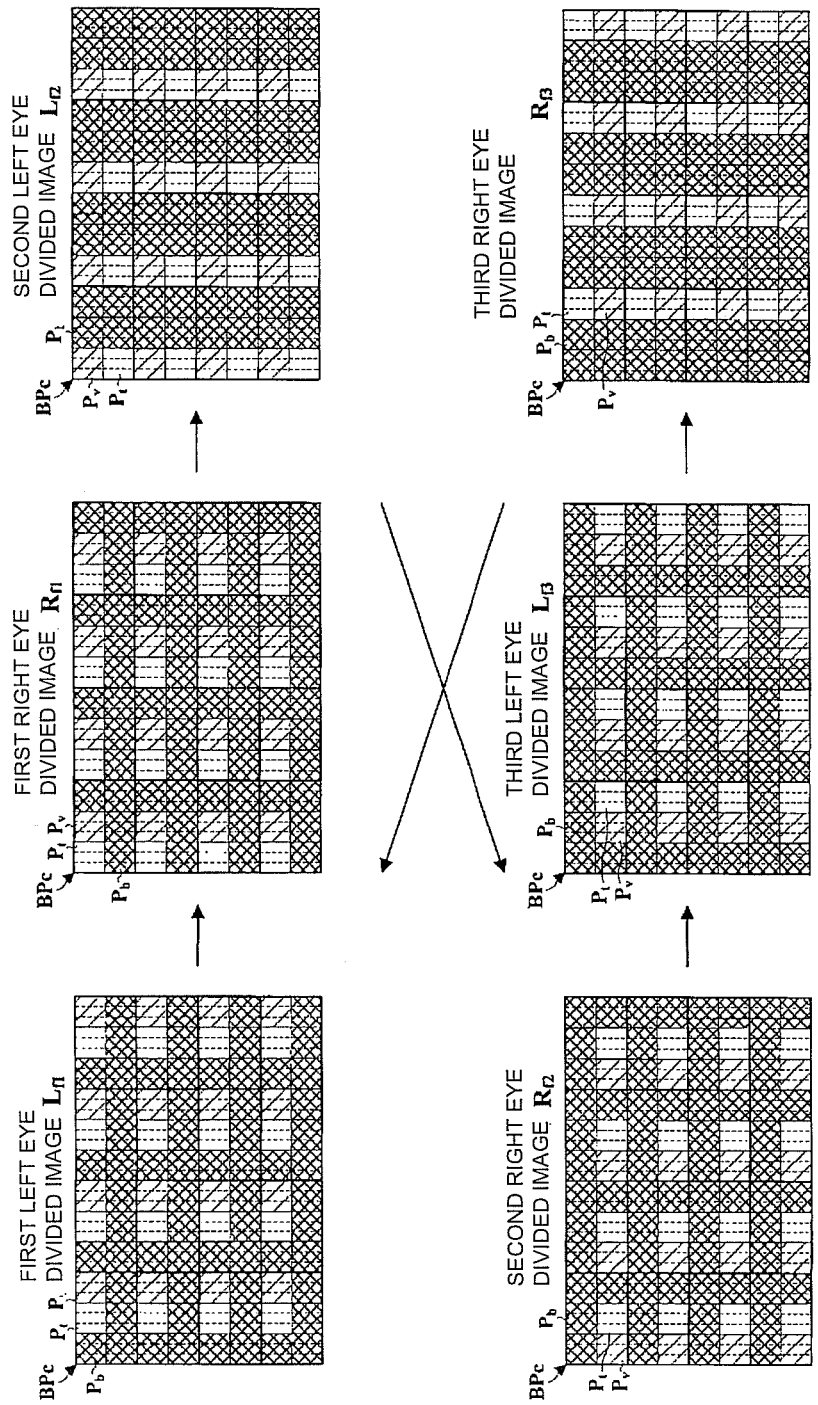
FIG. 9 is an explanatory diagram illustrating images subjected to black insertion according to the first embodiment.

The images displayed on the liquid crystal panel 2 will be described with reference to FIGS. 7 to 9. FIGS. 7 to 9 are explanatory diagrams illustrating images subjected to black insertion by synthesizing the mask image on the left and right alternate video signals.

FIG. 7 illustrates distribution of black-mask pixels and afterimage-produced pixels that exist on the display screen having, for example, 8×8 pixels of the liquid crystal panel 2 for a case of the mask pattern that includes the basic region having 2×2 pixels. One afterimage pixel Pv exists in each of the basic regions BPa. In FIG. 7, a crosshatched pixel Pb indicates a pixel subjected to black insertion, and the diagonal striped pixel Pv indicates a pixel subjected to an afterimage. Images are displayed by hollow pixels Pt and the diagonal striped pixels Pv.

A first left eye divided image Ld1 shows an image subjected to black insertion and the afterimages displayed on the liquid crystal panel 2 when the left eye divided double-speed video frame L11*d* has the first mask M1 synthesized thereon. Similarly, a first right eye divided image Rd1 shows an image subjected to black insertion and the afterimages displayed on the liquid crystal panel 2 when the right eye divided double-speed video frame R11*d* has the second mask M2 synthesized thereon. A second left eye divided image Ld2 shows an image subjected to black insertion and the afterimages displayed on the liquid crystal panel 2 when the left eye divided double-speed video frame L12*d* has the third mask M3 synthesized thereon. A second right eye divided image Rd2 shows an image subjected to black insertion and the afterimages displayed on the liquid crystal panel 2 when the right eye divided double-speed video frame R12*d* has the fourth mask M4 synthesized thereon. When the left eye divided double-speed video frame L21*d* has the first mask M1 synthesized thereon, the first left eye divided image Ld1 is displayed again.

As above, the first left eye divided image Ld1 and the second left eye divided image Ld2 display just a half of video information of the left eye video frame L10. In other words, a half of the pixels in the first left eye divided image Ld1 and the second left eye divided image Ld2 are displayed in black. Also, the same is applied to the first right eye divided image Rd1 and the second right eye divided image Rd2. As a result, it is possible to display images without reducing the resolution of the received video frames. In addition, one afterimage pixel Pv exists within the basic region BPa for both of the left eye divided image and the right eye divided image, and the afterimage pixels Pv exist spatially uniformly in each divided image. Also, since the number of the produced afterimage pixels is the same for both of the left eye divided image and the right eye divided image, the afterimage pixels exist uniformly over time for all of the divided images.

FIG. 8 illustrates distribution of the black-mask pixels and the afterimage-produced pixels that exist on the display screen having, for example, 8×12 pixels, of the liquid crystal panel 2 for a case, where the mask pattern has the basic region of 2×3 pixels and the basic region has two mask pixels.

A first left eye divided image Le1 shows an image subjected to black insertion and the afterimages displayed on the liquid crystal panel 2 when the left eye divided double-speed video frame L1ad has the fifth mask M5 synthesized thereon. Similarly, the first right eye divided image Re1 shows an image subjected to black insertion and the afterimages displayed on the liquid crystal panel 2 when the right eye divided double-speed video frame R1ad has the sixth mask M6 synthesized thereon. The second left eye divided image Le2 shows an image subjected to black insertion and the afterimages displayed on the liquid crystal panel 2 when the left eye divided double-speed video frame L1bd has the seventh mask M7 synthesized thereon. The second right eye divided image Re2 shows an image subjected to black insertion and the afterimages displayed on the liquid crystal panel 2 when the right eye divided double-speed video frame R1bd has the eighth mask M8 synthesized thereon. The third left eye divided image Le3 shows an image subjected to black insertion and the afterimages displayed on the liquid crystal panel 2 when the left eye divided double-speed video frame L1cd has the ninth mask M9 synthesized thereon. The third right eye divided image Re3 shows an image subjected to black insertion and the afterimages displayed on the liquid crystal panel 2 when the right eye divided double-speed video frame R1cd has the tenth mask M10 synthesized thereon. When, the left eye divided double-speed video frame L2ad has the fifth mask M5 synthesized thereon again, the first left eye divided image Le1 is displayed again.

As above, each of the first left eye divided image Le1, the second left eye divided image Le2, and the third left eye divided image Le3 displays just two thirds of video information of the left eye video frame. In other words, one third of the pixels in each of the first left eye divided image Le1, the second left eye divided image Le2, and the third left eye divided image Le3 are displayed in black. Also, the same is applied to the first right eye divided image Re1, the second right eye divided image Re2, and the third right eye divided image Re3. As a result, the three afterimage pixels Pv exist in the basic region BPb for both of the left eye divided image and the right eye divided image, and the afterimage pixels Pv spatially uniformly exist in each divided image. In addition, since the number of the produced afterimage pixels is the same for both of the left eye divided image and the right eye divided image, the afterimage pixels exist uniformly over time for all of the divided images.

FIG. 9 illustrates distribution of the pixels subjected to black insertion and the pixels subjected to the afterimages that exist on the display screen having, for example, 8×12 pixels on the liquid crystal panel 2 for a case, where the mask pattern has the basic region of 2×3 pixels and the basic region has four mask pixels.

A first left eye divided image Lf1 shows an image subjected to black insertion and the afterimages displayed on the liquid crystal panel 2 when the left eye divided double-speed video frame L1ad has the eleventh mask M11 synthesized thereon. Similarly, the first right eye divided image Rf1 shows an image subjected to black insertion and the afterimages displayed on the liquid crystal panel 2 when the right eye divided double-speed video frame R1ad has the twelfth mask M12 synthesized thereon. The second left eye divided image Lf2 shows an image subjected to black insertion and the afterimages displayed on the liquid crystal panel 2 when the left eye divided double-speed video frame L1bd has the thirteenth mask M13 synthesized thereon. The second right eye divided image Rf2 shows an image subjected to black insertion and the afterimages displayed on the liquid crystal panel 2 when the right eye divided double-speed video frame R1bd has the fourteenth mask M14 synthesized thereon. The third left eye divided image Lf3 shows an image subjected to black insertion and the afterimages displayed on the liquid crystal panel 2 when the left eye divided double-speed video frame L1cd has the fifteenth mask M15 synthesized thereon. The third right eye divided image Rf3 shows an image subjected to black insertion and the afterimages displayed on the liquid crystal panel 2 when the right eye divided double-speed video frame R1cd has the sixteenth mask M16 synthesized thereon. When the left eye divided double-speed video frame L2ad has the eleventh mask M11 synthesized thereon, the first left eye divided image Lf1 is displayed again.

Each of the first left eye divided image Lf1, the second left eye divided image Lf2, and the third left eye divided image Lf3 displays just one third of video information of the left eye video frame. In other words, two thirds of the pixels in each of the first left eye divided image Ld1, the second left eye divided image Ld2, and the third left eye divided image Lf3 are displayed in black. Also, the same is applied to the first right eye divided image Re1, the second right eye divided image Re2, and the third right eye divided image Re3. As a result, one afterimage pixel Pv exist in the basic region BPb for both of the left eye divided image and the right eye divided image, and the afterimage pixels Pv spatially uniformly exist in each divided image. In addition, since the number of the produced afterimage pixels is the same for both of the left eye divided image and the right eye divided image, the afterimage pixels exist uniformly over time for all of the divided images.

As above, when the number of the divided frames is 3, the afterimages are produced in different number of pixels (three pixels or one pixel) within the basic region depending on whether the mask image consists of two pixels or four pixels. However, since the afterimage pixels uniformly exist regardless of the frames, it is possible to reduce the deviation of the afterimages produced in the left eye video frame and the right eye video frame.

According to the liquid crystal display device 1 of the first embodiment, the afterimages are shown uniformly over space and time without the deviation of the afterimages produced in the left eye divided image and the right eye divided image. As a result, it is possible to reduce the burden of a user. In addition, by uniformly displaying the afterimages, the displayed afterimages become unnoticeable, and thereby it is possible to make the user feel as if the afterimages are reduced.

Second Embodiment

A liquid crystal display device according to the second embodiment will be described with reference to FIG. 10.

Figure 10:
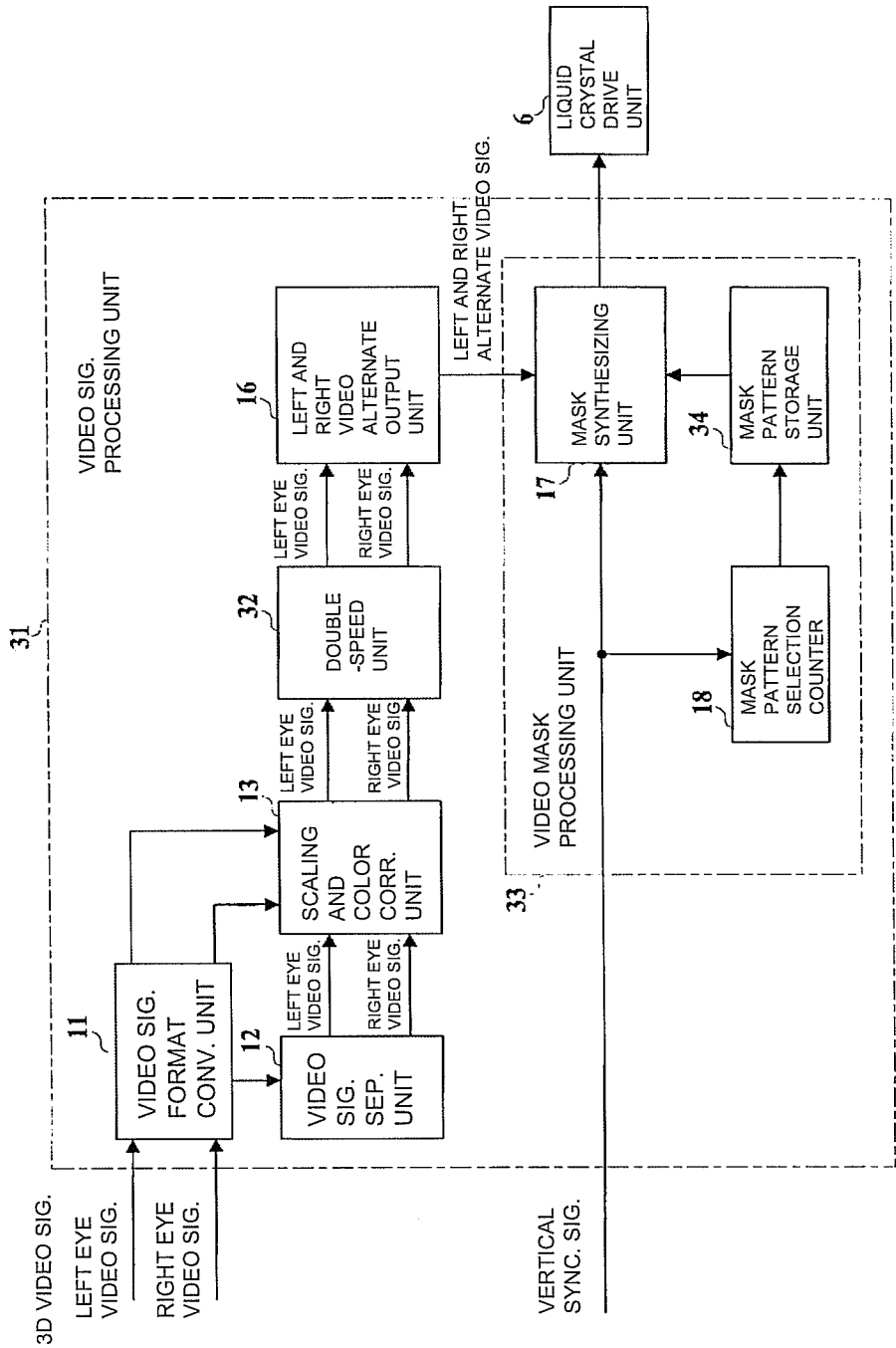
FIG. 10 is an explanatory diagram explaining mask patterns according to the second embodiment.

FIG. 10 is a block diagram illustrating a configuration of a video signal processing unit according to the second embodiment. In FIG. 10, description of parts indicated by the numerals same with the numerals of the first embodiment will be omitted since the parts have the configurations similar to those in the first embodiment. In the second embodiment, the division unit of the first embodiment is omitted, and a predefined number of the mask patterns are stored in a mask pattern storage unit. Therefore, the structures of the video signal processing unit and the liquid crystal display devices are, unless otherwise described below, similar to those of the first embodiment.

Figure 11A:
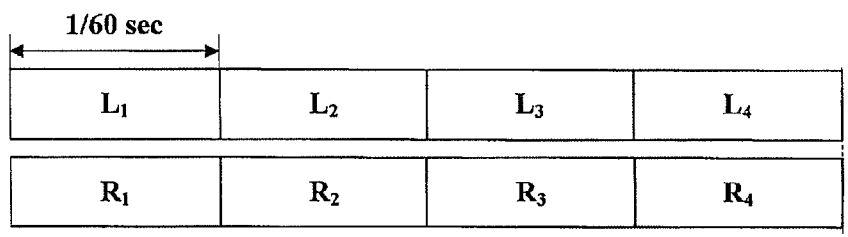
FIGS. 11(a) and 11(b) are explanatory diagrams explaining the increase in the frame rate according to the second embodiment.
Figure 11B:
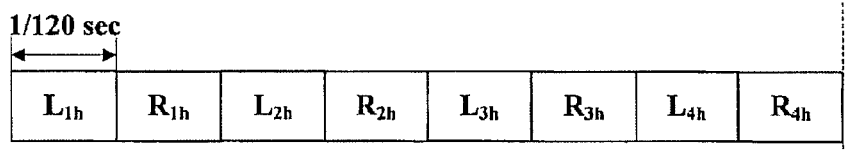

Features of the second embodiment reside in that the video signals outputted from the scaling and color correction unit 13 are directly received by a double-speed unit 32. For example, as shown in FIG. 11(a), left eye video frames L1, L2, L3, L4, . . . having the frame rate of 60 Hz and right eye video frames R1, R2, R3, R4, . . . having the frame rate of 60 Hz are independently inputted into the video signal format conversion unit 11, and the format of the video signal is converted and the converted video signal is inputted into the scaling and color correction unit 13. Each of the left eye video frame and right eye video frame received by the scaling and color correction unit 13 undergoes the process of the scaling and the tone correction and is inputted into the double-speed unit 32. The double-speed unit 32 converts each of the received video frames so that the frame rate is doubled. In other words, the received video frames are converted to left eye double-speed video frames L1h, L2h, L3h, L4h, . . . having the frame rate of 120 Hz and right eye double-speed video frames R1h, R2h, R3h, R4h, . . . having the frame rate of 120 Hz, and the converted video frames are outputted to the left and right video alternate output unit 16.

A video mask processing unit 33 has a mask pattern storage unit 34 that stores the mask patterns of a predefined even number that is equal to or greater than 4. For example, the mask pattern storage unit 34 stores the mask patterns (such as the first mask M1 to the fourth mask M4, the fifth mask M5 to the tenth mask M10, or the eleventh mask M11 to the sixteenth mask M16 shown in the first embodiment). The number of the mask patterns is as same as the number of the pixels consisting of the basic region, and the number of black-mask pixels within the basic region is the even number smaller than the number of the pixels in the basic region.

The mask synthesizing unit 17 synthesizes the mask patterns on the received video frame similarly to the first embodiment. In other words, the mask synthesizing unit 17 synthesizes the mask pattern, which is transmitted from the mask pattern storage unit 34, on the left and right alternate video signal for one frame outputted from the left and right video alternate output unit 16.

In addition, procedure of the masking process according to the second embodiment is the same as the procedure according to the first embodiment except that the procedure according to the second embodiment does not include the separation of the video signal (step S03) and the dividing of the video (step S05). In other words, predefined mask patterns are sequentially synthesized on the video frames in the double-speed display without dividing the video frames. The predefined mask pattern employs the mask pattern described in the first embodiment. In the first embodiment, the configuration of the mask pattern relates to the number of the divided frames. However, in the second embodiment, since the video frame is not divided, the configuration of the mask pattern is not limited by the number of the divided frames.

Figure 12:
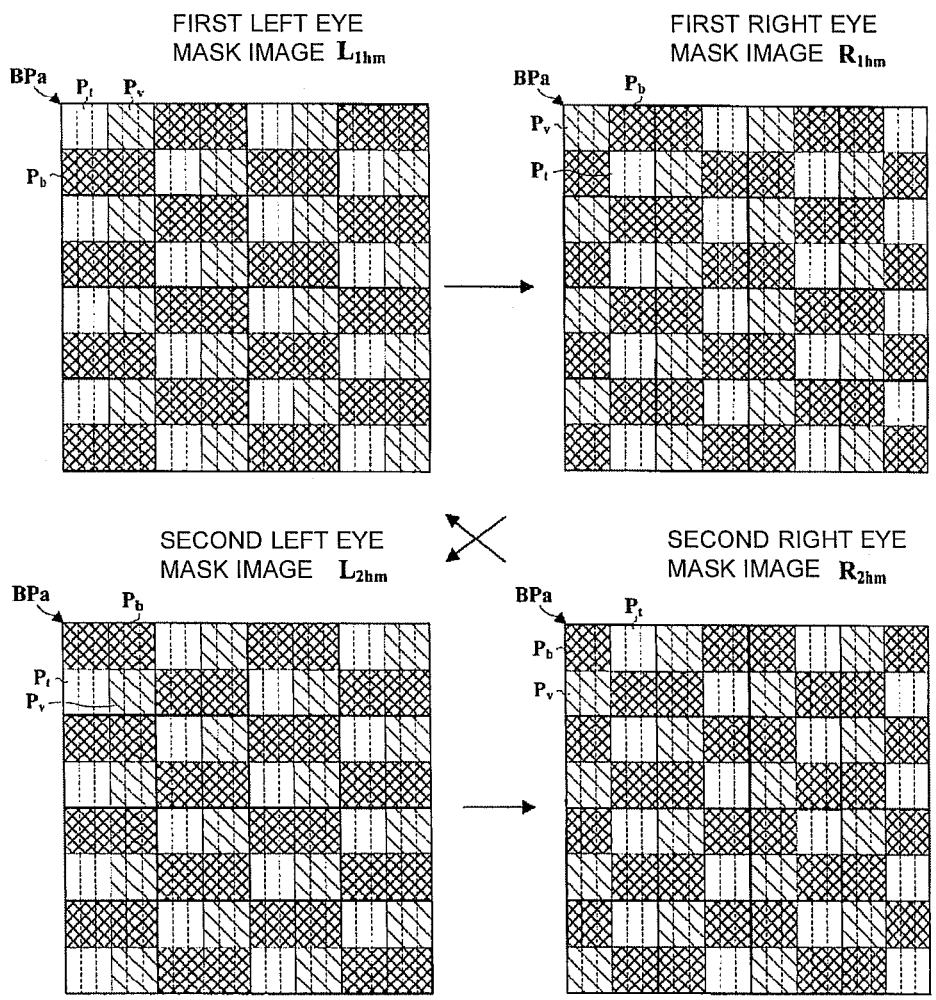
FIG. 12 is an explanatory diagram illustrating images subjected to black insertion according to the second embodiment.

Images displayed on the liquid crystal panel 2 through the masking process of the second embodiment will be described with reference to FIG. 12. FIG. 12 is an explanatory diagram illustrating images subjected to black insertion by synthesizing mask images on the left and right alternate video signal. FIG. 12 illustrates distribution of the pixels subjected to black insertion and the pixels with the afterimages on the display screen having, for example, 8×8 pixels of the liquid crystal panel 2 for a case, where the mask pattern has the basic region of 2×2 pixels. One afterimage pixel Pv exists in each basic region BPa.

A first left eye mask image L1hm shows an image subjected to black insertion and the afterimages displayed on the liquid crystal panel 2 when the left eye double-speed video frame L1h has the first mask M1 synthesized thereon. Similarly, a first right eye mask image R1hm shows an image subjected to black insertion and the afterimages displayed on the liquid crystal panel 2 when the right eye double-speed video frame R1h has the second mask M2 synthesized thereon. A second left eye mask image L2hm shows an image subjected to black insertion and the afterimages displayed on the liquid crystal panel 2 when the left eye double-speed video frame L2h has the third mask M3 synthesized thereon. A second right eye mask image R2hm shows an image subjected to black insertion and the afterimages displayed on the liquid crystal panel 2 when the right eye double-speed video frame R2h has the fourth mask M4 synthesized thereon. When the left eye double-speed video frame L3h has the first mask M1 synthesized thereon, the first left eye mask image L1hm is displayed again.

The first left eye mask image L1hm is a frame having video information different from that of the second left eye mask image L2hm, and similarly, the first right eye mask image R1hm is a frame having video information different from that of the second right eye mask image R2hm. Due to the above, one afterimage pixel Pv exists in each basic region BPa for both of the left eye image and right eye image, and the afterimage pixels Pv spatially uniformly exist in each video frame, although the image resolution is partially degraded by the black insertion. Also, the number of the produced afterimage pixels is the same for both of the left eye video and right eye images. As a result, the afterimage pixels are produced uniformly over time for all of the video frames. The above effect is achieved even when other mask pattern described in the first embodiment is employed.

The present invention is not limited to the above embodiments, but may be modified and implemented as below.

Figure 13:
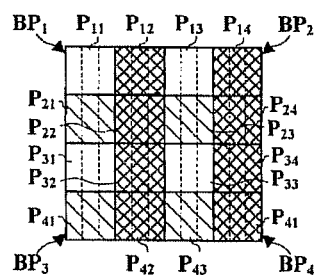
FIG. 13 is an explanatory diagram explaining mask patterns according to the modification.
Figure 13:
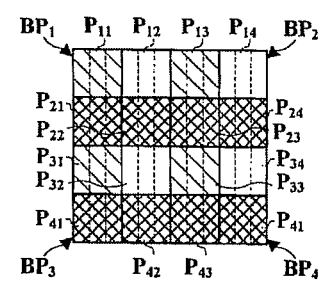
Figure 13:
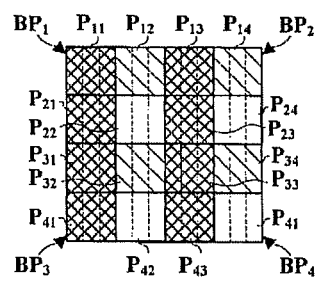
Figure 13:
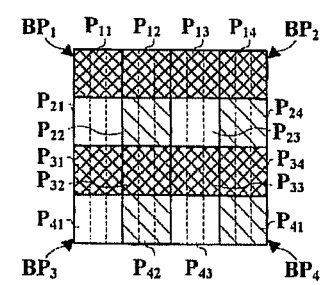

(1) In the above embodiment, in a case, where the basic region has 2×2 pixels, the four mask pixels are not linearly arranged in series over two basic regions. However, the four mask pixels may be linearly arranged as shown in FIG. 13. Also in this case, the afterimages are uniformly produced regardless of the divided frames.

(2) In the above embodiment, the present invention employs the basic region having 2×2 or 2×3 pixels. However, the present invention is not limited to the above. The present invention may alternatively employ a basic region having 2×5 pixels, 5×2 pixels, or more pixels.

(3) In the above embodiment, even in a case, where the video frame is divided into four frames, eight mask patterns will be prepared for use. However, four different mask patterns may be alternatively used twice in cycles to uniformly display the afterimages. The above is applicable for a case, where the video frame is divided into frames of an even multiple that is equal to or greater than 4. In other words, in a case, where each of the left eye and right eye video frames is divided into the frames of the even multiple that is equal to or greater than 4 and is alternately displayed, the total number of the divided frames becomes the multiple of 4. Thus, by repeatedly synthesizing, on the left and right alternate video signals, the mask patterns (the first mask M1 to the fourth mask M4) used when the video frame is divided into two frames, it is possible to uniformly display the afterimages.

(4) In the above embodiment, the liquid crystal display device is a 3D display device alternately displaying the left eye and right eye images. However, the liquid crystal display device is not limited to the above. Alternatively, the liquid crystal display device may be a 2D dual view display device that allows viewers to view mutually-different images when viewing in two directions.

DESCRIPTION OF THE NUMERALS

1 . . . liquid crystal display device
2 . . . liquid crystal panel
5, 31 . . . video signal processing unit
7, 17 . . . mask synthesizing unit
14 . . . division unit
16 . . . left and right video alternate output unit
17 . . . mask synthesizing unit
18 . . . mask pattern selection counter
19, 34 . . . mask pattern storage unit

The invention claimed is:

1. An image display method, wherein black insertion is provided to two types of video frames, the method comprising:
    defining basic regions in a pixel region of a liquid crystal panel, the basic region being a pixel region having m pixels arrayed in a matrix, wherein m is an even number equal to or greater than 4,
    setting the number of pixels subjected to black insertion in the basic region at an even number less than m and equal to or greater than 2,
    when m-frame cycles are composed of the two types of the video frames which are alternately displayed on the liquid crystal panel, sequentially providing m black display patterns to each of the basic regions for each frame, the m black display patterns having different arrangements of the pixels subjected to black insertion in the basic region; and repeating the sequentially providing of the m black display patterns in m-frame cycles,
    wherein each of the pixels in the basic region is subjected to black insertion by the same number of times throughout the m black display patterns.

2. The image display method according to claim 1, further comprising:
    dividing each of the two types of the video frames, in a time division manner, into frames of an integral multiple equal to or greater than 2,
    setting the number m of the pixels in the basic region at a double of the number of the divided frames, and
    when the divided frames of one of the two types of the video frames serving as odd-numbered frames and the divided frames of the other one of the video frames serving as even-numbered frames are alternately displayed, sequentially providing the m black display patterns in the basic region to each of the basic regions for each frame.

3. The image display method according to claim 1, further comprising:
    dividing each of the two types of the video frames, in a time division manner, into frames of an even multiple equal to or greater than 4,
    wherein the number m of the pixels in the basic region is 4, the number of the pixels subjected to black insertion in the basic region is 2, and
    when the divided frames of one of the two types of the video frames serving as odd-numbered frames and the divided frames of the other one of the video frames serving as even-numbered frames are alternately displayed, sequentially providing four black display patterns in the basic region to each of the basic regions for each frame.

4. The image display method according to claim 2, further comprising:
    dividing each of the two types of the video frames, in a time division manner, into two frames,
    wherein the number m of the pixels in the basic region is 4, and
    the number of the pixels subjected to black insertion in the basic region is 2.

5. The image display method according to claim 2, further comprising:
    dividing each of the two types of the video frames, in a time division manner, into three frames,
    wherein the number m of the pixels in the basic region is 6, and
    the number of the pixels subjected to black insertion in the basic region is 2.

6. The image display method according to claim 2, further comprising:
    dividing each of the two types of the video frames, in a time division manner, into three frames;
    the number m of the pixels in the basic region is 6, and
    the number of the pixels subjected to black insertion in the basic region is 4.

7. The image display method according to claim 1, wherein the pixels subjected to black insertion in one of the basic regions are non-linearly arranged with the pixels subjected to black insertion in an adjacent one of the basic regions.

8. The image display method according to claim 1, wherein one of the two types of the video frames is a left eye video frame, and the other one of the video frames is a right eye video frame.

9. A liquid crystal display device comprising:
    a mask pattern storage unit that stores m mask patterns,
    wherein basic regions are defined in a pixel region of a liquid crystal panel, the basic region being a pixel region having m pixels arrayed in a matrix, m being an even number equal to or greater than 4,
    the m mask patterns have different arrangements of mask pixels in the basic region, the number of the mask pixels being an even number smaller than m and equal to or greater than 2,
    a mask pattern selection unit that sequentially selects each of the mask patterns;
    an alternate output unit that alternately outputs two types of video frames and m-frame cycles are composed of the two types of video frames,
    a mask synthesizing unit that synthesizes the selected mask pattern on the video frames outputted from the alternate output unit, and
    wherein the mask pixel is a pixel subjected to black insertion, and the mask synthesizing unit repeats sequentially synthesizing the m mask patterns in m-frame cycles, and
    wherein each of the pixels in the basic region is replaced by the mask pixel by the same number of times in the m mask patterns.

10. The liquid crystal display device according to claim 9, further comprising:
    a division unit that divides each of the received two types of the video frames into frames of an integral multiple equal to or greater than 2,
    wherein the number m of the pixels in the basic region is a double of the number of the divided frames, and
    the alternate output unit alternately outputs each of the divided frames of the two types of the video frames.

11. The liquid crystal display device according to claim 9, further comprising:
  a division unit that divides each of the received two types of the video frames into frames of an even multiple equal to or greater than 4, wherein the number m of the pixels in the basic region is 4, and
  the alternate output unit alternately outputs each of the divided frames of the two types of the video frames.

12. The liquid crystal display device according to claim 10, wherein the basic region is a pixel region of a matrix with two rows and two columns; and
  the mask pattern storage unit stores four mask patterns having different arrangements of two mask pixels in the basic region.

13. The liquid crystal display device according to claim 10, wherein the basic region is a pixel region of a matrix with two rows and three columns or of a matrix with three rows and two columns; and
  the mask pattern storage unit stores six mask patterns having different arrangements of two mask pixels in the basic region.

14. The liquid crystal display device according to claim 10, wherein the basic region is a pixel region of a matrix with two rows and three columns or of a matrix with three rows and two columns; and
  the mask pattern storage unit stores six mask patterns having different arrangements of four mask pixels in the basic region.

15. The liquid crystal display device according to claim 9, wherein the mask pixels in one of the basic regions are non-linearly arranged with the mask pixels in an adjacent one of the basic regions.

16. The liquid crystal display device according to claim 9, wherein one of the two types of the video frames is a left eye video frame, and the other one of the video frames is a right eye video frame.

* * * * *